(12) United States Patent
Konishi et al.

(10) Patent No.: US 11,614,909 B2
(45) Date of Patent: Mar. 28, 2023

(54) IMAGE PROCESSING APPARATUS AND CONTROL METHOD

(71) Applicant: SHARP KABUSHIKI KAISHA, Sakai (JP)

(72) Inventors: Toshiyuki Konishi, Sakai (JP); Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/540,914

(22) Filed: Dec. 2, 2021

(65) Prior Publication Data

US 2022/0188053 A1 Jun. 16, 2022

(30) Foreign Application Priority Data

Dec. 11, 2020 (JP) .............................. JP2020-206247

(51) Int. Cl.
*G06F 3/12* (2006.01)
(52) U.S. Cl.
CPC .......... *G06F 3/1273* (2013.01); *G06F 3/1204* (2013.01); *G06F 3/1238* (2013.01); *G06F 3/1255* (2013.01)

(58) Field of Classification Search
None
See application file for complete search history.

(56) References Cited

U.S. PATENT DOCUMENTS

2009/0315904 A1* 12/2009 Sugimoto .......... H04N 1/00503
345/531
2018/0314474 A1* 11/2018 Nakaya .............. H04N 1/00832
2020/0159479 A1* 5/2020 Yoshida ................ G06F 3/1234

FOREIGN PATENT DOCUMENTS

JP 2010-128702 A 6/2010
JP 2018-114735 A 7/2018

* cited by examiner

*Primary Examiner* — Frantz Bataille
(74) *Attorney, Agent, or Firm* — ScienBiziP, P.C.

(57) ABSTRACT

In one embodiment, a display, a storage, and a controller which executes a job of image processing based on a setting value are provided, and the controller stores, as setting history information, the setting value of the executed job in the storage; displays, on the display, a selection screen to select the setting history information stored in the storage; and executes, when the job based on the setting history information received via the selection screen is to be executed, confirmation processing according to the state of user authentication.

12 Claims, 27 Drawing Sheets

FIG. 3

SETTING HISTORY INFORMATION

| JOB ID | JOB FUNCTION | EXECUTION USER NAME | START DATE AND TIME/END DATE AND TIME | SETTING VALUES | |
|---|---|---|---|---|---|
| JB000335 | SIMPLE COPY | S000123 | 2019/11/14 16:20 / 2019/11/14 16:21 | COLOR MODE :FULL COLOR<br>PAPER SIZE :A4<br>DOCUMENT SIZE :A4<br>PAPER TYPE :PLAIN PAPER<br>NUMBER OF COPIES :10 COPIES<br>ZOOM FUNCTION :On<br>ZOOM MAGNIFICATION :100%<br>COPY DENSITY :AUTO<br>PAPER TRAY :MANUAL FEED | DOUBLE-SIDED PRINTING :No<br>N-Up PRINTING :1-1<br>FIT PAGE :Yes<br>FINISHING FUNCTION :STAPLING<br>    :LATERAL BINDING-ONE PLACE<br>DATA CORRECTION FUNCTION :Yes<br>COLOR MODE ADJUSTMENT FUNCTION :Yes<br>CHARACTER/IMAGE SYNTHESIS FUNCTION :No<br>SPECIAL PRINTING FUNCTION :No |
| JB000334 | SIMPLE COPY | S000065 | 2019/11/14 15:10 / 2019/11/14 15:15 | COLOR MODE :MONOCHROME<br>PAPER SIZE :A4<br>DOCUMENT SIZE :A4<br>PAPER TYPE :PLAIN PAPER<br>NUMBER OF COPIES :100 COPIES<br>ZOOM FUNCTION :On<br>ZOOM MAGNIFICATION :100%<br>COPY DENSITY :AUTO<br>PAPER TRAY :No.1 | DOUBLE-SIDED PRINTING :Yes<br>N-Up PRINTING :1-1<br>FIT PAGE :Yes<br>FINISHING FUNCTION :No<br>DATA CORRECTION FUNCTION :Yes<br>COLOR MODE ADJUSTMENT FUNCTION :Yes<br>CHARACTER/IMAGE SYNTHESIS FUNCTION :No<br>SPECIAL PRINTING FUNCTION :No |
| JB000333 | SIMPLE SCAN (Scan to Email) | S000123 | 2019/11/14 14:50 / 2019/11/14 14:51 | READ MODE :COLOR<br>RESOLUTION :600dpix600dpi<br>DOCUMENT SIZE :A4<br>OUTPUT FORMAT :PDF<br>    :COLOR<br>COMPRESSION SCHEME :No<br>DRIVER :TWAIN-COMPLIANT | TRANSMISSION DESTINATION ADDRESS :aaaaa@bbbbb.co.jp<br>TRANSMISSION DESTINATION NAME :aaaaa<br>TRANSMISSION SOURCE ADDRESS :mfp001@ccc.co.jp<br>TRANSMISSION SOURCE NAME :mfp001<br>PROTOCOL :SMTP<br>PORT :25 |
| JB000332 | SIMPLE FAX | S000222 | 2019/11/14 13:00 / 2019/11/14 13:02 | CHARACTER/PICTURE :CHARACTER<br>READ MODE :NORMAL<br>DOCUMENT SIZE :A4<br>TRANSMISSION DOCUMENT SIZE :A4<br>ENCODING SCHEME :MMR<br>COMMUNICATION MODE :SUPER G3 | TRANSMISSION DESTINATION NUMBER :55-6666-7777<br>TRANSMISSION DESTINATION NAME :dddd CORPORATION<br>TRANSMISSION SOURCE NUMBER :11-2222-3333<br>TRANSMISSION SOURCE NAME :ccc CORPORATION<br>COMMUNICATION LINE :PSTN<br>COMMUNICATION SPEED :33.6kbps |

FIG. 21

| Job | PRINT | SCAN | FAX | INTERNET FAX | | |
|---|---|---|---|---|---|---|
| | DESTINATION | SET TIME | NUMBER OF PAGES | STATUS | | |
| ↱ | 00000000 | 13:14 07/09 | 0000/0001 | WAITING | | |
| ↳ | 00000000 | 13:14 07/09 | 0000/0001 | RECEIVING | | |
| | SEQUENTIAL BROADCASTING | 13:17 07/09 | 0001 | WAITING | | |
| ↱ | 123 | 13:16 07/09 | 0000/0001 | RECEIVING | | |

W40

SELECT ALL JOBS
☑ SET TO MULTIPLE SELECTION MODE
CHECK RECEIVED DATA
CHECK TRANSFER ERROR BOX OF RECEIVED DATA
BACK

JOB STATUS

BACK

RESERVATION/ EXECUTION IN PROGRESS ▶ COMPLETED

IMAGE PROCESSING APPARATUS AND CONTROL METHOD

BACKGROUND OF THE INVENTION

Field of the Invention

The present invention relates to, for example, an image processing apparatus.

Description of the Background Art

Image processing apparatuses which store setting values related to execution of jobs, such as printing, faxing, and scanning, as setting history information, are known.

Recently, an attempt has been made to reuse the setting history information. The setting history information includes the setting value related to execution of a job. Accordingly, a user who wishes to re-execute a job that is the same as or similar to the job related to such setting history information can imitatively use the setting value included in the setting history information, thereby saving time and effort of entering the setting values related to execution of the job.

The setting history information is presented to a user via a display device or the like provided in the image processing apparatus. For example, Japanese Unexamined Patent Application Publication No. 2010-128702 discloses that operation history information associated with a login user is acquired and displayed, when a request to acquire the operation history information is made by the user.

Also, Japanese Unexamined Patent Application Publication No. 2018-114735 discloses that, when a setting operation related to a job is received, and a setting confirmation screen is displayed in response to pressing of a start key, after which the user operates an execution key displayed on the setting confirmation screen, the job execution is started under the set condition.

When the job is to be executed by using the setting history information, the user needs to select the setting history information related to the desired job from among many pieces of the setting history information displayed on a screen. At this time, if the setting history information related to a job different from the job intended by the user is erroneously selected and executed, the user will obtain an execution result of the unintended job.

In addition, in an apparatus which makes the form of displaying the setting history information different according to the state of user authentication, the forms of displaying the setting history information are different in the case of having no user authentication and in the case of having user authentication. In the case of having no user authentication, pieces of setting history information related to all jobs executed by the respective users are displayed chronologically. Therefore, it is highly likely that the user who wishes to execute a specific job will make an error in selecting the setting history information corresponding to the job in question.

Meanwhile, in the case of having user authentication, only the pieces of setting history information related to jobs executed by the authenticated user are displayed. In this case, there is no possibility that the user will select the setting history information related to jobs executed by other users. However, since pieces of the setting history information related to a number of jobs that the user himself/herself executed in the past are displayed as a list, there is still a possibility that incorrect setting history information may be selected.

It is therefore an object of the present disclosure to provide an image processing apparatus and the like which can prevent a job, which is different from the job intended by the user, from being executed, by performing confirmation processing according to the user authentication before the job is executed.

SUMMARY OF THE INVENTION

An image processing apparatus according to the present disclosure is provided with: a display; a storage; and a controller which executes a job of image processing on the basis of a setting value, in which the controller is characterized in that it stores, as setting history information, the setting value of the executed job in the storage; displays, on the display, a selection screen to select the setting history information stored in the storage; and executes, when the job based on the setting history information received via the selection screen is to be executed, confirmation processing according to a state of user authentication.

Also, a control method according to the present disclosure pertains to a control method of controlling an image processing apparatus including a display, a storage, and a controller which executes a job of image processing on the basis of a setting value, in which the control method is characterized by including: storing, as setting history information, the setting value of the executed job in the storage; displaying, on the display, a selection screen to select the setting history information stored in the storage; and controlling the controller to execute, when the job based on the setting history information received via the selection screen is to be executed, confirmation processing according to a state of user authentication.

According to the present disclosure, it is possible to provide an image processing apparatus and the like which can prevent a job, which is different from the job intended by the user, from being executed, by performing confirmation processing according to the state of user authentication before the job is executed.

BRIEF DESCRIPTION OF THE DRAWINGS

FIG. 3 is a table illustrating setting history information.

FIG. 21 is a diagram illustrating an operation example of the first embodiment.

DESCRIPTION OF THE PREFERRED EMBODIMENTS

Embodiments of the present disclosure will be described below with reference to the accompanying drawings. In describing the embodiments, as an image processing apparatus, a multifunction peripheral which has a print function including copying, a facsimile function, a scanning function, a network communication function, and the like, and executes a job based on each of those functions will be described as an example. Also, the following embodiments have been presented by way of example only for describing the present disclosure, and the technical scope of the invention as recited in the appended claims is in no way limited by the description given below.

1. First Embodiment

A multifunction peripheral 10 according to a first embodiment is in the form of a multifunction peripheral which executes job confirmation processing according to the state of user authentication before executing the job.

1.1 Functional Configuration

Figure 1:
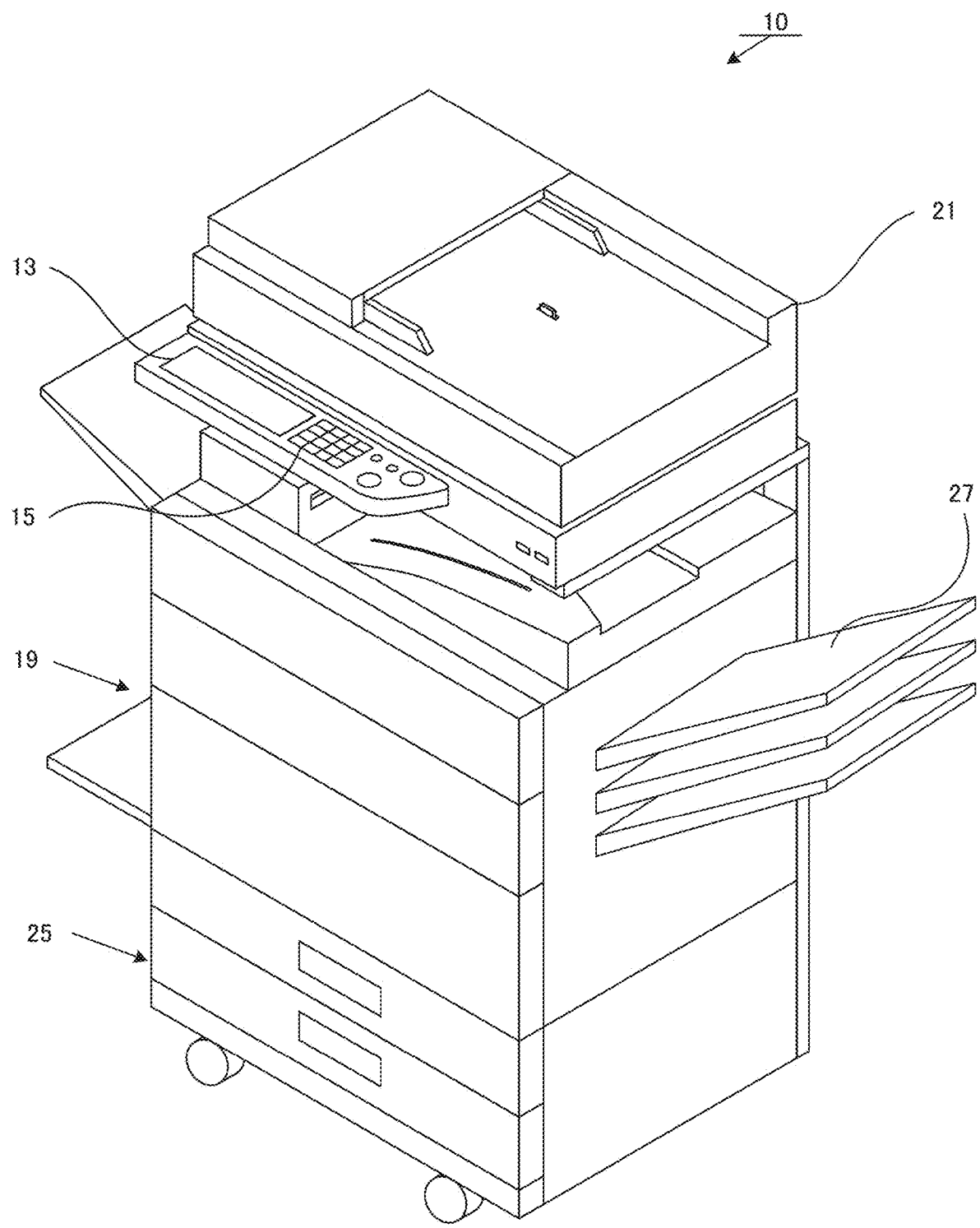
FIG. 1 is an external view of a multifunction peripheral according to a first embodiment.
Figure 2:
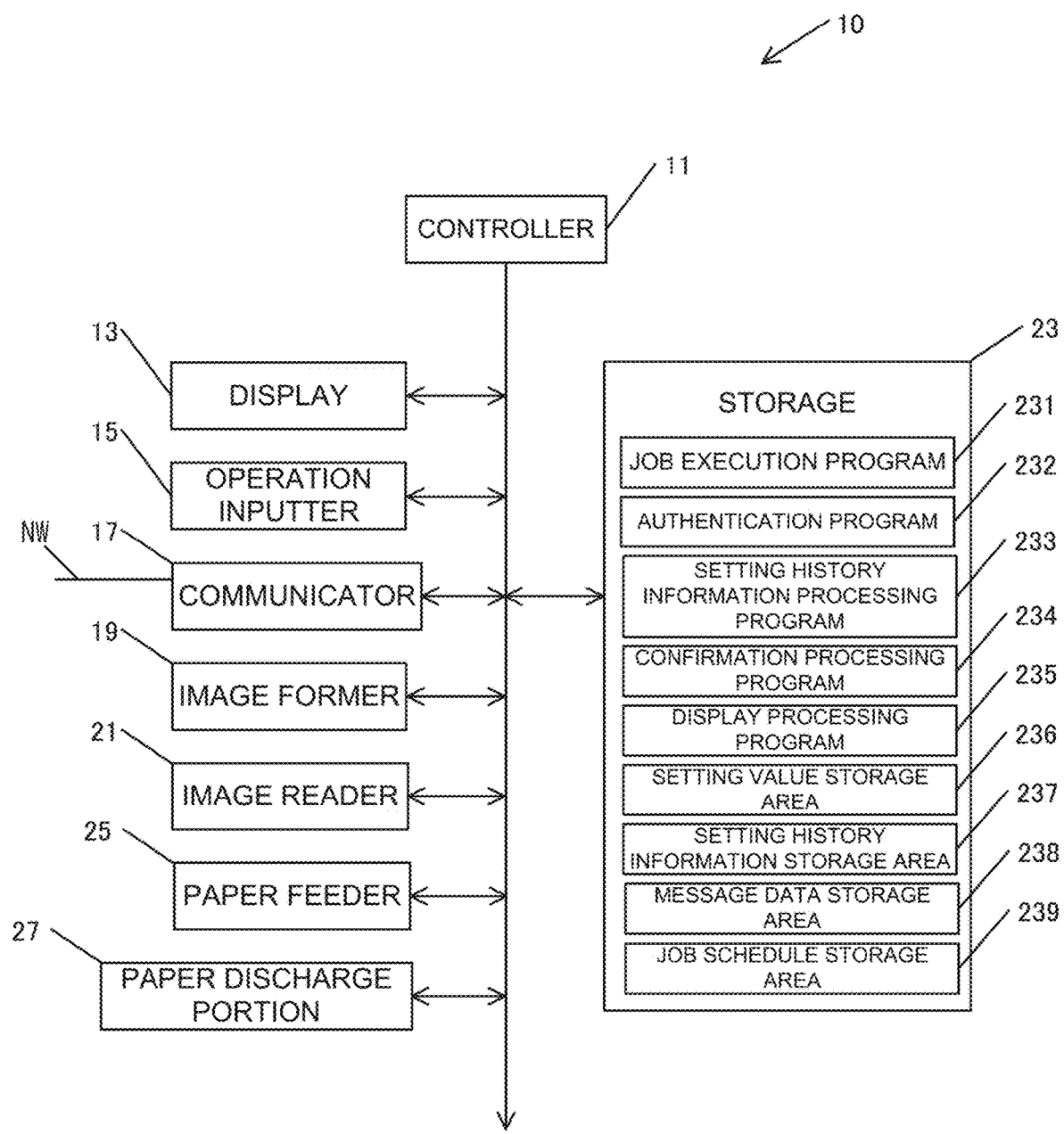
FIG. 2 is a functional configuration diagram of the multifunction peripheral according to the first embodiment.

A functional configuration of the multifunction peripheral 10 according to the first embodiment will be described by referring to FIGS. 1 and 2. FIG. 1 is an external view for illustrating an overall configuration of the multifunction peripheral 10. FIG. 2 is a functional configuration diagram of the multifunction peripheral 10.

The multifunction peripheral 10 has a copy function of forming an image based on scan data generated by reading a document, etc., on a sheet of paper as a recording medium, and a print function of forming an image on a sheet of paper, on the basis of an image signal received via a network, etc., or image data stored in a portable storage medium, etc.

The multifunction peripheral 10 also has a facsimile function of performing facsimile transmission and reception via a general subscriber telephone line, a facsimile communication network, or the like. Furthermore, the multifunction peripheral 10 has a data temporary storage function of temporarily storing various kinds of data such as image data and fax data in a storage medium, and a data transmission function of transmitting various kinds of data via an e-mail or the like.

As illustrated in FIGS. 1 and 2, the multifunction peripheral 10 is provided with a controller 11, a display 13, an operation inputter 15, a communicator 17, an image former 19, an image reader 21, a storage 23, a paper feeder 25, and a paper discharge portion 27.

The controller 11 controls the multifunction peripheral 10 as a whole. The controller 11 is composed of, for example, one or more arithmetic devices (such as central processing units [CPUs]). The controller 11 reads and executes a job execution program 231, an authentication program 232, a setting history information processing program 233, a confirmation processing program 234, a display processing program 235, and the like, that are stored in the storage 23, thereby implementing the functions.

The display 13 displays various kinds of information to a user, for example. The display 13 can be composed of, for example, a liquid crystal display (LCD) or an organic electro-luminescence (EL) display.

The operation inputter 15 receives an input of information such as a setting value set by the user, for example. The operation inputter 15 can composed of, for example, a hardware key (e.g., a numeric keypad), buttons, and the like. The operation inputter 15 can also be configured as a touch panel allowing input via the display 13. In this case, as a method for detecting an input on the touch panel, a method such as a resistive film method, an infrared method, an electromagnetic induction method, or a capacitive sensing method may be employed.

The communicator 17 connects to other devices via a network (NW) such as a local area network (LAN), a wide area network (WAN), the Internet, a general subscriber telephone line, or a facsimile communication network, and transmits and receives various kinds of information including image data and fax data, an e-mail, and the like. The communicator 17 is configured as, for example, a communicable interface, and may employ either wired or wireless connection, or both of the wired and wireless connections as the connection method.

The image former 19 forms an image based on image data on a sheet of paper. The image former 19 feeds paper from the paper feeder 25, forms an image based on the image data on the paper, and thereafter discharges the paper to the paper discharge portion 27. The image former 19 can be composed of, for example, a laser printer using an electrophotographic method. The image former 19 performs image formation by using toner supplied from toner cartridges, not illustrated, corresponding to the toner colors (such as yellow (Y), magenta (M), cyan (C), and black (K).

The image reader 21 generates scan data by reading a document or the like to be read. The image reader 21 can be composed of a scanner device or the like which converts, by an image sensor such as a charge-coupled device (CCD) or a contact image sensor (CIS), an image into an electric signal, and generates digital data by quantizing and encoding the image signal.

The paper feeder 25 includes a tray for storing paper in such a state that a plurality of sheets of paper are stacked. The tray can store paper of various sizes and thicknesses according to the use. The paper feeder 25 can be configured from a plurality of trays which individually store paper of different sizes, such as A4 size, B5 size, or A3 size.

The paper discharge portion 27 is provided with a plate-like stacker on which paper discharged outside the apparatus after an image has been formed is stacked. As illustrated in FIG. 1, a plurality of stackers may be provided at respective places so that paper of different sizes can be discharged.

The storage 23 stores various programs necessary for the operation of the multifunction peripheral 10, and various kinds of data. The storage 23 can be composed of, for example, a volatile memory such as a random-access memory (RAM), and a non-volatile memory such as a solid state drive (SSD), which is a semiconductor memory, a hard disk drive (HDD), and a read-only memory (ROM).

The storage 23 stores the job execution program 231, the authentication program 232, the setting history information processing program 233, the confirmation processing program 234, and the display processing program 235, and secures a setting value storage area 236, a setting history information storage area 237, a message data storage area 238, and a job schedule storage area 239.

The job execution program 231 is a program that the controller 11 reads in order to perform processing associated with execution of the print function, the facsimile function, the scanning function, the network communication function, and the like, per job. The controller 11 controls each component involved with the execution of the job by reading the job execution program 231.

The authentication program 232 is a program that the controller 11 reads when the user logs into the multifunction peripheral 10. The controller 11 which has read the authentication program 232 performs authentication on the basis of, for example, a login user name and a login password input via a login screen.

The setting history information processing program 233 is a program that the controller 11 reads when, for example, acquisition of a setting value or the like related to the execution of a job, generation of setting history information, and various kinds of processing with respect to the setting history information are to be performed. The controller 11 acquires the setting value related to the execution of the job by reading the setting history information processing program 233, and stores the acquired setting value in the setting value storage area 236. Also, the controller 11 generates the setting history information by using the acquired setting value, and stores the generated setting history information in the setting history information storage area 237.

The confirmation processing program 234 is a program that the controller 11 reads when arbitrary setting history information is selected by the user, and a job based on the setting history information in question is to be executed. For example, the controller 11 reads the confirmation processing program 234 upon receiving pressing of a start button which accepts execution of the job related to the selected setting history information. As the controller 11 reads the confirmation processing program 234, the controller 11 provides the user with information which constitutes a decision-making material for confirming whether or not the setting history information selected by the user is that related to a job desired by the user, and a message or the like which prompts attention to be called.

The display processing program 235 is a program that the controller 11 reads in display processing of displaying the setting history information, and display processing of displaying various screens which will be described later. As the controller 11 reads the display processing program 235, and controls the display 13, the controller 11 can perform the display processing for the setting history information and various screens.

The setting value storage area 236 is a storage area for storing various setting values related to the execution of a job. The setting values include a setting value set by the user in executing each job, an apparatus default value held by the apparatus itself, and the like.

Note that the setting value may be a value directly input by the user via the operation inputter 15 or a touch panel or the like displayed on the display 13. Further, when the multifunction peripheral 10 is connected to an external terminal device or the like (not illustrated) via the communicator 17, the controller 11 can also acquire the setting value input via a control program such as a printer driver introduced in the external terminal device. The controller 11 stores the acquired setting value in the setting value storage area 236.

The setting history information storage area 237 is a storage area for storing the setting history information in the form of a data table. The setting history information can be constituted as history information which includes information formed of a combination of some of or all of the setting values that are stored in the setting value storage area 236 and history information related to the execution of a job, such as a job function, an execution user name, and start date and time/end date and time, and to which a job ID for uniquely identifying the above information is added.

FIG. 3 is a diagram illustrating a configuration example of the setting history information. Here, for example, job ID: JD000335 indicates that it corresponds to the setting history information related to a simple copy in which a user with the user name: S000123 is the execution user. The above job is a job executed by the execution user S000123 at 16:20 on Nov. 14, 2019, and ended at 16:21 on the same date. Note that set values (items) included in the setting history information are not particularly limited as long as they are the setting values stored in the setting value storage area 236. Also, the setting values indicated in FIG. 3 are merely examples, and the setting values of the present disclosure are not limited by what has been illustrated in FIG. 3 alone.

The message data storage area 238 is a storage area for storing, in the form of text data, various messages to be read out by the controller 11 and displayed on the display 13 in the confirmation processing. Examples of specific messages will be described later.

The job schedule storage area 239 is a storage area for storing, for example, schedule data for managing the schedule of a job executed regularly on a specific date and time. As the controller 11 refers to the schedule data stored in the job schedule storage area 239, the controller 11 can ascertain the schedule of the job executed regularly on the specific date and time.

1.2 Flow of Processing

Figure 4:
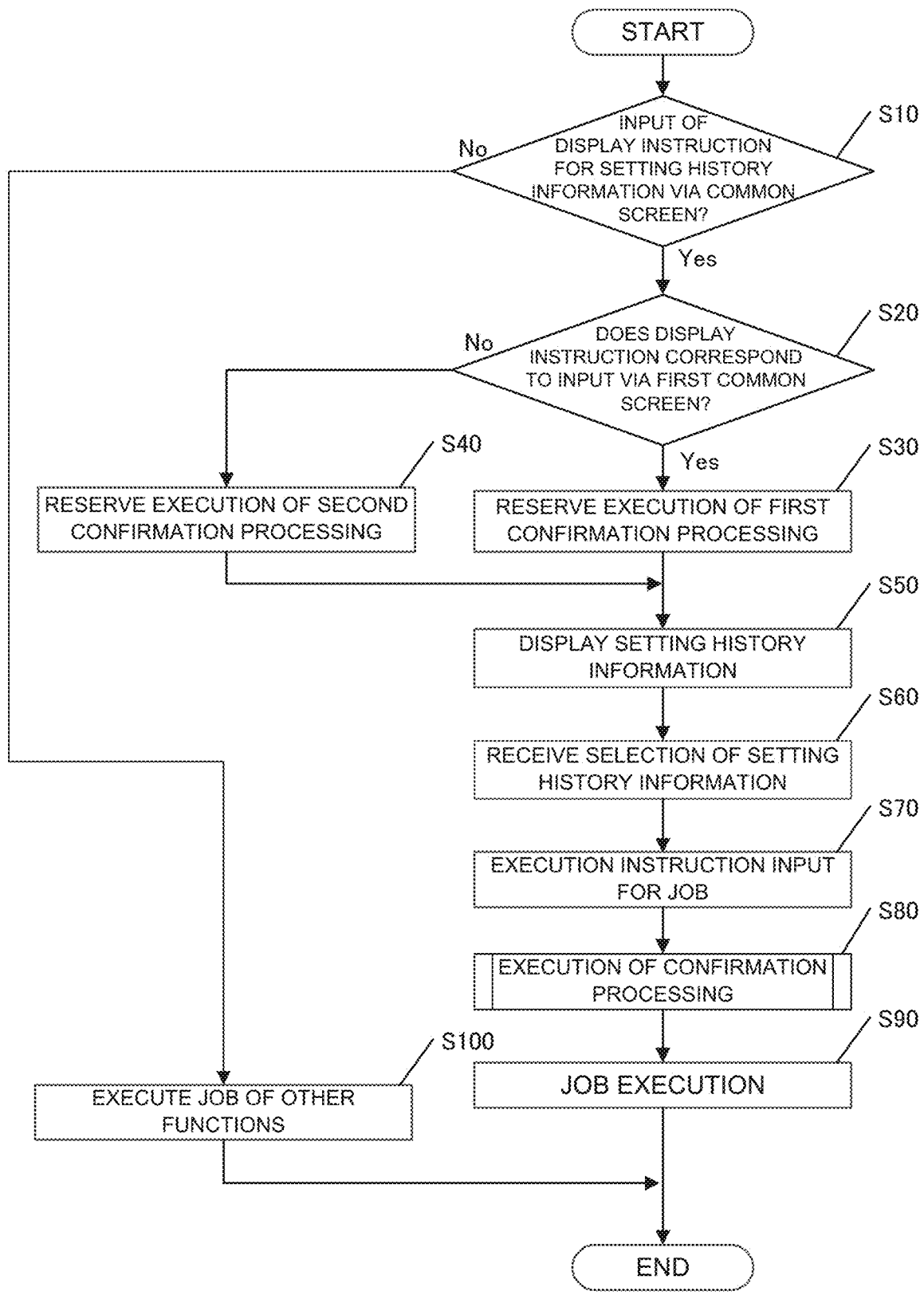
FIG. 4 is a flowchart illustrating the flow of processing in the first embodiment.

Next, a flow of processing according to the first embodiment will be described. FIG. 4 is a flowchart illustrating processing to be performed from a display instruction input for the setting history information of the multifunction peripheral 10 to job execution, etc.

First, the controller 11 determines whether a display instruction input for the setting history information is received via a common screen (step S10).

The common screen refers to a screen which has, in order to receive selection of the job function or an input of instruction to display the setting history information or the like, input buttons arranged in a consolidated manner, and the input buttons have a screen configuration in which the respective functions and information are represented by illustrations with figures, characters/numbers, or symbols, etc. The common screen is the so-called home screen, and functions as an interface for the user, for example.

In the present specification, the common screen that the controller 11 displays when the apparatus is powered on, when the apparatus is restored from a sleep mode, before the user logs into the apparatus, and in a case where a user authentication function is in an off state, for example, will be described as a first common screen. In other words, the common screen that is displayed in a state of having no user authentication (i.e., the state where the user has not logged into the apparatus) is the first common screen.

Meanwhile, differently from the first common screen, the common screen that is displayed in a state of having user authentication (i.e., the state where the user has logged into the apparatus) is a second common screen. In the present specification, a user who has logged into the apparatus may be described as a login user.

When the display instruction input for the setting history information is received via the common screen, the controller 11 determines whether the instruction to display the setting history information corresponds to an input made via the first common screen (step S20).

If it is determined that the instruction to display the setting history information corresponds to an input made via the first common screen (step S20; Yes), the controller 11 reserves confirmation processing to be executed by the controller 11 in the job execution as first confirmation processing (step S30).

Meanwhile, if it is determined that the instruction to display does not correspond to an input made via the first common screen, in other words, the instruction to display corresponds to an input made via the second common screen (step S20; No), the controller 11 reserves confirmation processing to be executed by the controller 11 in execution of the job as second confirmation processing that is different from the first confirmation processing (step S40).

Next, the controller 11 reads the display processing program 235, and also acquires the setting history information which needs to be displayed from the setting history information storage area 237. The controller 11 displays the setting history information that has beers read out on the display 13 as a list (step S50).

Here, when the instruction to display the setting history information corresponds to an input made via the first common screen, the controller 11 acquires pieces of the setting history information related to jobs executed by all users who use the multifunction peripheral 10 from the setting history information storage area 237. Then, the controller 11 displays the acquired pieces of the setting history information in chronological order from newest to oldest.

Meanwhile, when the instruction to display the setting history information corresponds to an input made via the second common screen, the controller 11 collects pieces of the setting history information related to jobs executed by the login user from the setting history information storage area 237, and displays those pieces of the setting history information in chronological order from newest to oldest, for example.

The user selects the setting history information related to the job to be executed. The controller 11 receives selection of the setting history information by the user (step S60).

Next, the controller 11 receives an execution instruction input for the job based on the setting history information selected by the user (step S70).

When the instruction to execute the job is input by the user, the controller 11 executes the first confirmation processing or the second confirmation processing according to an execution reservation of the confirmation processing (step S80).

After executing the first confirmation processing or the second confirmation processing, the controller 11 executes the job by reading the job execution program 231 (step S90), and ends the processing.

Incidentally, if it is determined that the display instruction input for the setting history information has not been received via the common screen (step S10; No), the controller 11 determines that a job of the other functions (for example, a print function, a facsimile function, a data transmission function, etc.) is to be executed.

The controller 11 executes the job related to the determined other function (step S100), and ends the processing.

Next, the confirmation processing related to step S80 of FIG. 4 will be described by referring to FIGS. 5 to 14, Processing steps illustrated by the flowcharts of FIGS. 5 to 14 each correspond to the confirmation processing to be executed when an execution instruction input for a job (for example pressing of an execution button, etc.) is received, and before the job is executed. As the user refers to a message and information or the like being displayed by the confirmation processing, he/she can confirm whether the setting history information selected by himself/herself is correct or incorrect.

Note that the processing steps illustrated by the flowcharts of FIGS. 5 to 14 each correspond to one aspect of the confirmation processing of the present disclosure. The present processing is that basically executed as the controller 11 reads the confirmation processing program 234.

Here, the confirmation processing illustrated in each figure may be executed independently or by combining respective processes of the confirmation processing when a job is a compound job such as Scan to Email, for example.

Figure 5:
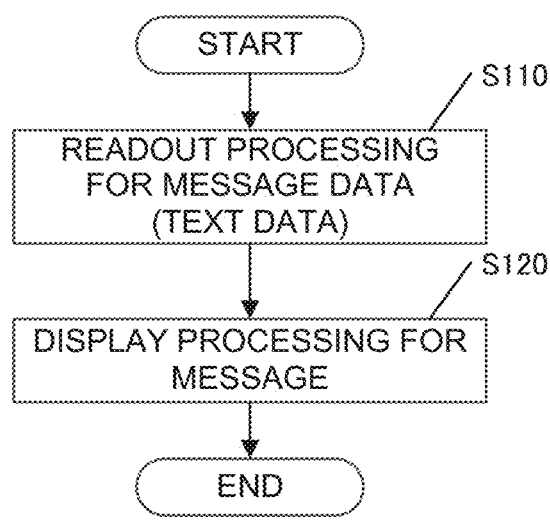
FIG. 5 is a flowchart illustrating the flow of processing in the first embodiment.

FIG. 5 is a flowchart illustrating a mode of performing, in executing a job based on the selected setting history information, display processing of displaying a message asking whether or not to execute the job, as the first confirmation processing.

When an execution instruction input for a job is received and the confirmation processing is started, the controller 11 reads out message data (text data) from the message data storage area 238 (step S110). At this time, the message to be read is, for example. "The selected job will be executed. OK to execute?", in other words, the message with the aim of asking whether or not to execute the job.

Next, the controller 11 reads the display processing program 235. The controller 11 controls the display 13, and displays a message that has been read out in step S110 (step S120).

Figure 6:
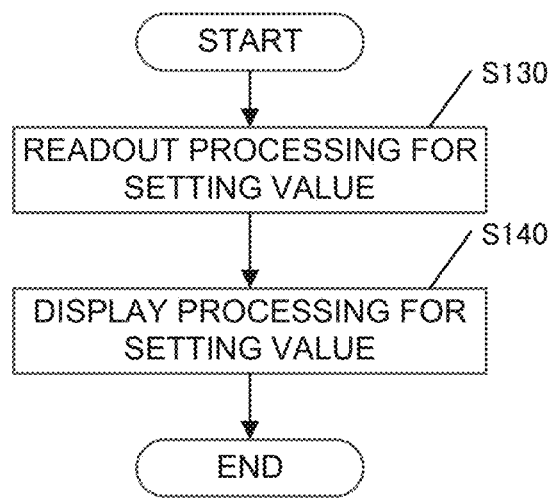
FIG. 6 is a flowchart illustrating the flow of processing in the first embodiment.

FIG. 6 is a flowchart illustrating a mode of performing, in executing a job based on the selected setting history information, display processing of displaying the setting values so that the substance of the aforementioned setting history information can be confirmed.

When an execution instruction input for a job is received and the confirmation processing is started, the controller 11 reads out the setting values included in the setting history information in question from the setting value storage area 236 (step S130).

Next, the controller 11 reads the display processing program 235. Then, the controller 11 controls the display 13, and displays the setting values that have been read out in step S130 (step S140). At this time, it is also possible to display a message asking whether or not to execute the job, as has been described with reference to FIG. 5.

Figure 7:
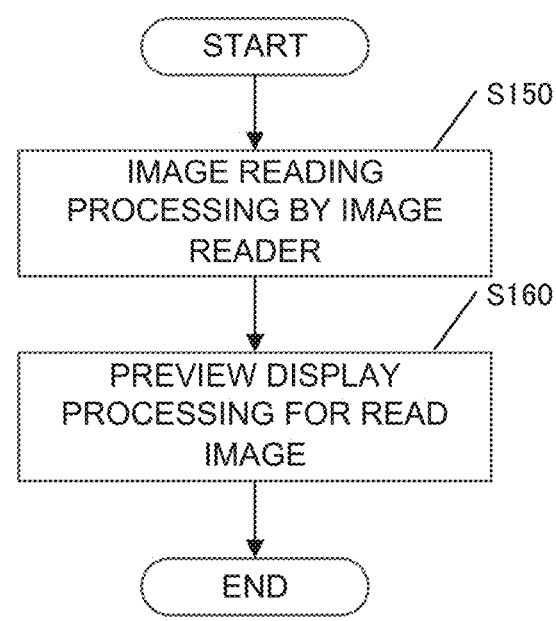
FIG. 7 is a flowchart illustrating the flow of processing in the first embodiment.

FIG. 7 is a flowchart illustrating a mode of performing, in executing a scan job based on the selected setting history information, preview display processing so that the substance of a read image can be confirmed.

When an execution instruction input for the job is received and the confirmation processing is started, the controller 11 controls the image reader 21, and executes image reading processing (step S150).

Next, the controller 11 controls the display 13, and performs the preview display processing for the read image which has been generated on the basis of the image read in step S150 (step S160).

Figure 8:
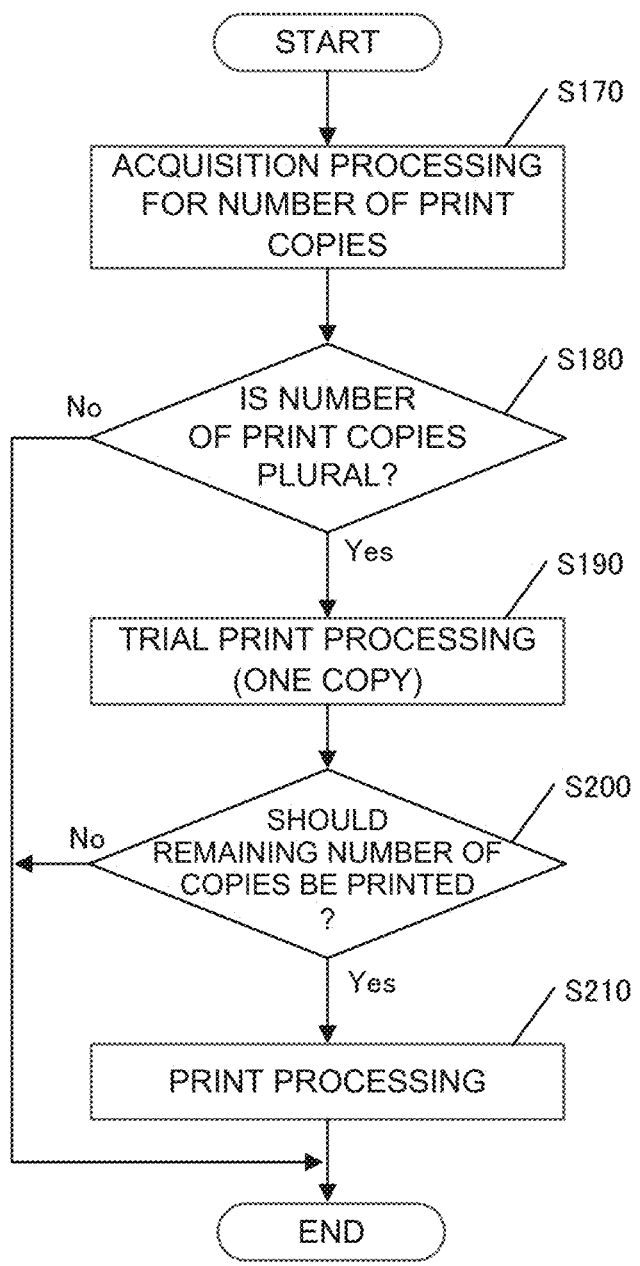
FIG. 8 is a flowchart illustrating the flow of processing in the first embodiment.

FIG. 8 is a flowchart illustrating a mode of performing, in executing a print job based on the selected setting history information, trial print processing.

When an execution instruction input for the job is received and the confirmation processing is started, the controller 11 acquires the number of print copies as the setting value related to the setting history information (step S170).

If the acquired number of print copies is plural (step S180; Yes), the controller 11 prints only one copy as a trial print by controlling the image former 19 (step S190).

Next, the controller 11 performs display processing of displaying a message with the aim of asking the user whether the remaining number of copies should be printed or not (step S200).

If printing of the remaining number of copies is selected by the user (step S200; Yes), the controller 11 executes the print processing for the remaining number of copies (step S210).

Meanwhile, if the acquired number of print copies is not plural (step S180; No), or if printing of the remaining number of copies is not selected by the user (step S200; No), the controller 11 ends the processing.

Figure 9:
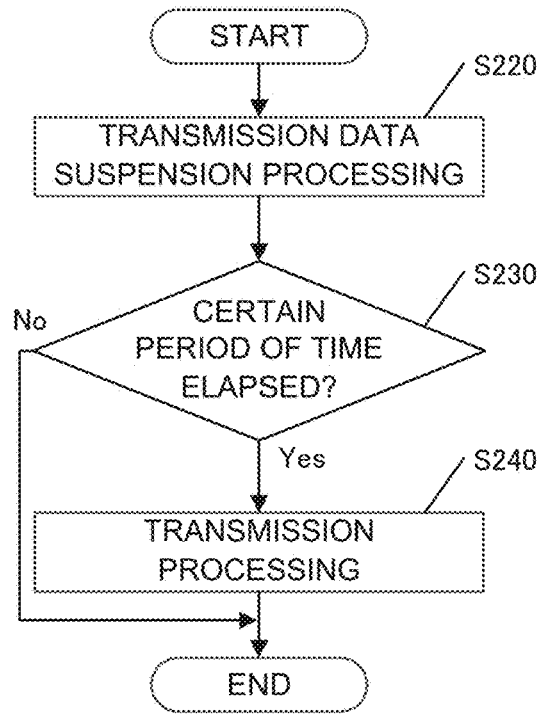
FIG. 9 is a flowchart illustrating the flow of processing in the first embodiment.

FIG. 9 is a flowchart illustrating a mode of performing, in executing a transmission job based on the selected setting history information, transmission-after-temporary-suspension-processing, which transmits transmission data after temporary suspension, in order to prevent erroneous transmission of the transmission data.

When an execution instruction input for the job is received and the confirmation processing is started, the controller 11 executes the processing of transmission data suspension (step S220).

After a certain period of time has elapsed (step S230; Yes), the controller 11 executes the transmission processing for the temporarily suspended transmission data (step S240).

Figure 10:
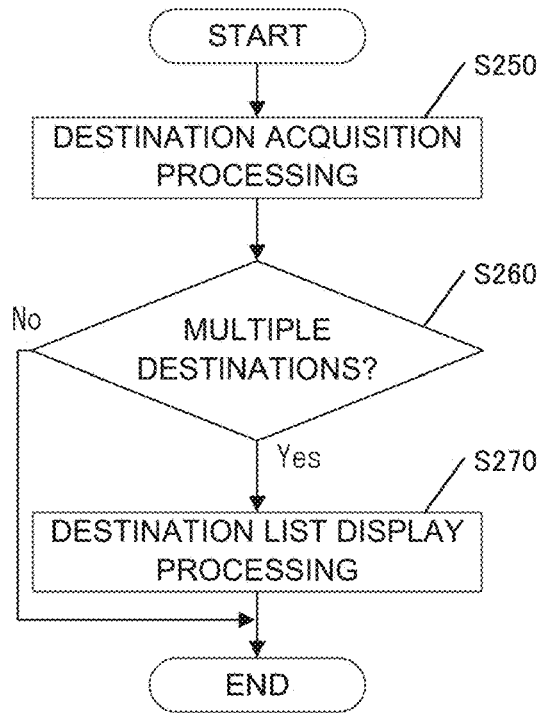
FIG. 10 is a flowchart illustrating the flow of processing in the first embodiment.

FIG. 10 is a flowchart illustrating a mode of performing, in executing a transmission job based on the selected setting history information, destination list display processing, which displays a list of destinations so that the details of the sending destination can be confirmed, in order to prevent erroneous transmission of the transmission data.

When an execution instruction input for the job is received and the confirmation processing is started, the controller 11 acquires the destination of the transmission data as the setting value related to the setting history information (step S250).

If a plurality of transmission data destinations are specified (step S260; Yes), the controller 11 executes the destination list display processing (step S270). Meanwhile, if a plurality of transmission data destinations are not specified (step S260; No), the controller 11 ends the processing.

Figure 11:
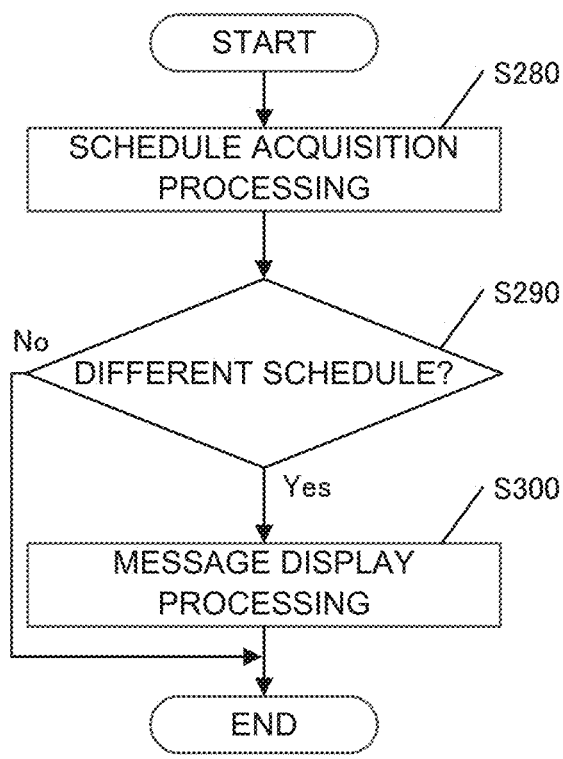
FIG. 11 is a flowchart illustrating the flow of processing in the first embodiment.

FIG. 11 is a flowchart illustrating a mode of performing message display processing of asking, in a schedule job which executes a specific job regularly, on the basis of the selected setting history information, whether or not to execute the job at a timing different from that of regular execution.

When an execution instruction input for the job is received and the confirmation processing is started, the controller 11 acquires schedule data related to the job in question from the job schedule storage area 239 (step S280).

The controller 11 refers to the acquired schedule data. Then, if the job execution is set to a schedule different from that of the regular execution by the user (step S290; Yes), the controller 11 executes the display processing of displaying a message asking whether or not to execute the job (step S300). Meanwhile, if the job execution is set to the same schedule as that of the regular execution (step S290; No), the controller 11 ends the processing.

Figure 12:
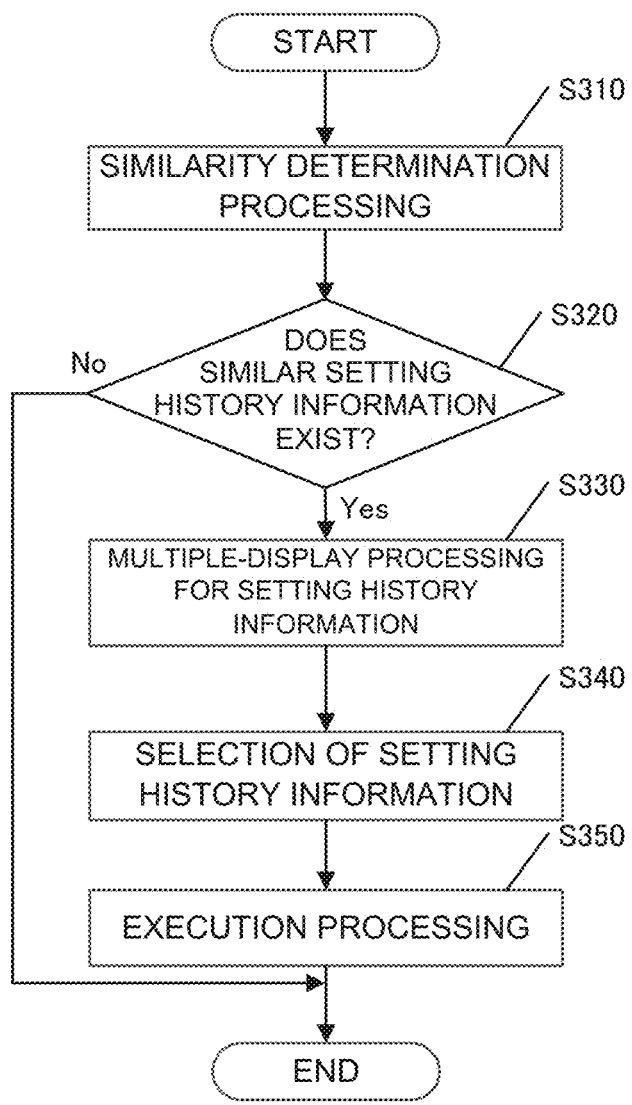
FIG. 12 is a flowchart illustrating the flow of processing in the first embodiment.

FIG. 12 is a flowchart illustrating a mode of performing, in executing a job based on the selected setting history information, multiple-display processing of displaying multiple pieces of similar setting history information, when there exist pieces of similar setting history information in a similar time period. Here, a similar time period is intended as, for example, a time period of three hours or so before or after the execution date and time of the job based on the selected setting history information. Note that the time period of three hours or so before or after the execution, which has been mentioned above as the similar time period, is merely an example, and this time period can be changed as appropriate by system settings or the like.

When an execution instruction input for a job is received and the confirmation processing is started, the controller 11 executes similarity determination processing of determining similarity between the setting values of the received setting history information and the setting values of the other pieces of setting history information stored in the setting history information storage area 237 (step S310). Here, the similarity determination processing will be described. In the similarity determination processing, the selected setting history information is compared with the other pieces of setting history information stored in the setting history information storage area 237, which are pieces of the setting history information of the jobs executed in a time period of three hours or so before or after the execution date and time of the job based on the selected setting history information. Further, in the similarity determination processing, pieces of information having the same job type, and having the same setting values at a rate of 60% or more are determined as being similar, and when there is more than one piece of applicable information, two pieces of information, for example, are displayed in descending order of agreement rate of the setting values. Note that the processing which has been mentioned above as the similarity determination processing is merely an example, and the agreement rate of the setting values, and the number of pieces of the similar setting history information to be displayed can be changed as appropriate. In addition, the similarity determination processing is not limited to the processing method described above, and analogy determination processing based on other analogy determination criteria may alternatively be performed.

If similar setting history information exists (step S320; Yes), the controller 11 executes the display processing of displaying similar getting history information (step S330).

Next, the controller 11 receives selection of the setting history information by the user (step S340), and executes the job based on the selected setting history information (step S350). Meanwhile, if there exists no similar setting history information (step S320; No), the controller 11 ends the processing.

Figure 13:
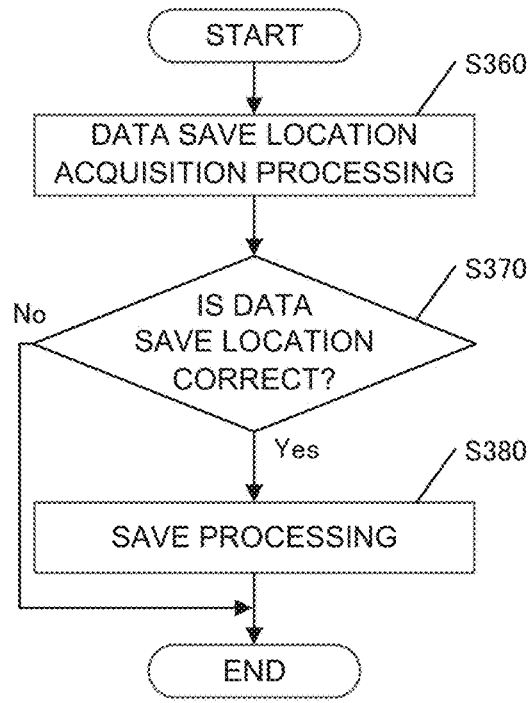
FIG. 13 is a flowchart illustrating the flow of processing in the first embodiment.

FIG. 13 is a flowchart illustrating a mode of performing, in executing a filing job based on the selected setting history information, display processing, etc., of displaying a message asking whether a save location of data related to the execution of the job is correct or incorrect.

When an execution instruction input for the job is received and the confirmation processing is started, the controller 11 executes data save location acquisition processing (step S360).

Next, the controller 11 executes the display processing of displaying a message asking whether the data save location acquired in step S360 is correct or incorrect (step S370).

If it is determined by the user that the data save location is correct (step S370; Yes), the controller 11 executes the data saving processing (step S380).

Figure 14:
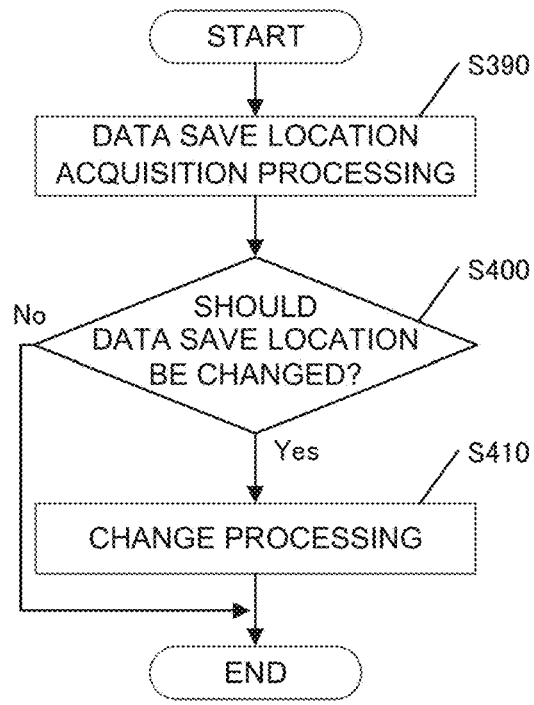
FIG. 14 is a flowchart illustrating the flow of processing in the first embodiment.

Meanwhile, if it is determined by the user that the data save location is not correct (step S370; No), the controller 11 does not execute the data saving processing, and ends the processing, FIG. 14 is a flowchart illustrating a mode of performing, in executing the filing job based on the selected setting history information, display processing, etc., of displaying a message asking about a change in the data save location, if the data save location related to the execution of the job has been changed.

When an execution instruction input for the job is received and the confirmation processing is started, the controller 11 executes the data save location acquisition processing (step S390).

Next, the controller 11 executes the display processing of displaying a message asking whether the data save location acquired in step S390 should be changed (step S400).

If it is determined by the user that the data save location is to be changed (step S400: Yes), the controller 11 executes change processing of changing the data save location (step S410).

Meanwhile, if it is determined by the user that the data save location is not to be changed (step S400; No), the controller 11 does not execute the change processing of changing the data save location, and ends the processing.

1.3 Operation Examples 1.3.1 Confirmation Processing Via First Common Screen

Next, operation examples will be described. In the present disclosure, the confirmation processing to be executed by the controller 11 is executed via the first common screen in a case where the user is not authenticated. Meanwhile, the confirmation processing is executed via the second common screen if the user is authenticated. Therefore, in the description of the following operation examples, the confirmation processing via the first common screen will be described first, and then the confirmation processing via the second common screen will be described.

Figure 15:
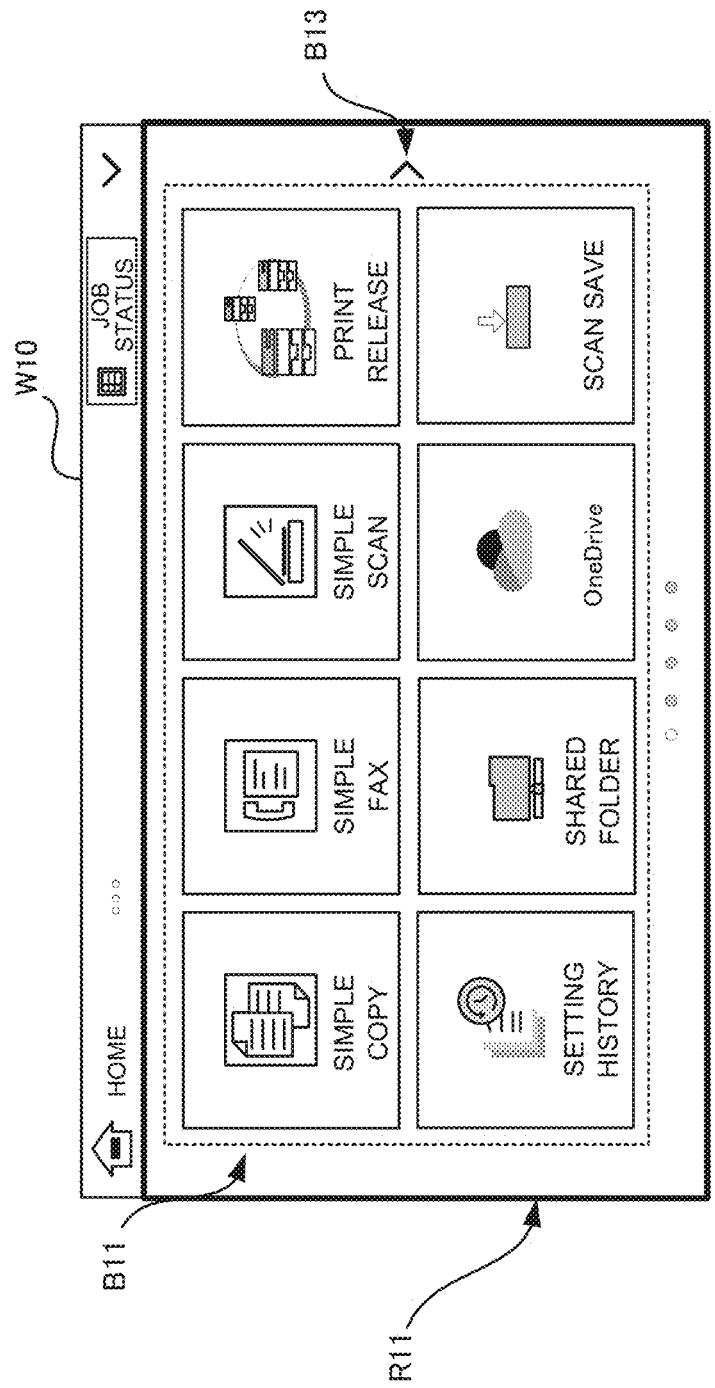
FIG. 15 is a diagram illustrating an operation example of the first embodiment.

FIG. 15 is a diagram illustrating a configuration example of the first common screen. A first common screen W10 is a home screen to be displayed when the apparatus is powered on, when the apparatus is restored from a sleep mode, before a login user logs into the apparatus, and when the authentication function is in an off state.

The first common screen W10 includes a job function and the like display area R11, and a job function and the like display area switching button B13.

The job function and the like display area M1 is an area for displaying, in a consolidated manner, job function and the like input buttons B11 for receiving selection of each job function, and an instruction to display the setting history information, etc. The job function and the like input buttons B11 are input buttons having a screen configuration in which the respective job functions and respective pieces of information are represented by illustrations with figures, characters/numbers, or symbols, etc.

The job function and the like display area R11 in FIG. 15 is an example of an area composed of the job function and the like input buttons B11, which receive selection of each job function, such as Simple Copy, Simple Fax, Simple Scan, Print Release, Shared Folder, OneDrive, and Scan Save, as the job functions, and a display instruction input for the setting history information.

The job function and the like display area switching button B13 receives pressing by the user when the display contents of the job function and the like display area R11 are to be switched. When the job function and the like display area switching button B13 is pressed by the user, the display contents of the job function and the like display area R11 are switched as the job function and the like input buttons B11 are switched.

Figure 16:
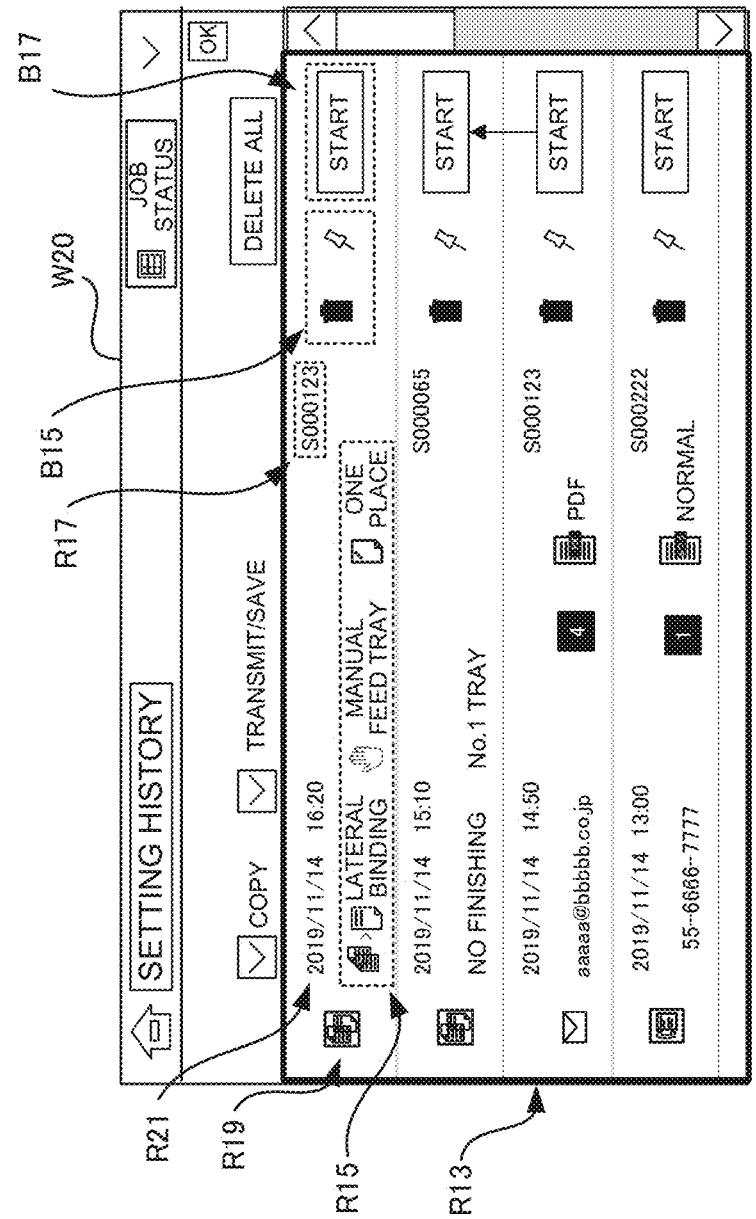
FIG. 16 is a diagram illustrating an operation example of the first embodiment.

FIG. 16 shows a configuration example of a setting history information display screen W20 that the controller 11 displays when the job function and the like input button B11 that is related to instruction to display the setting history information, as shown in FIG. 15, is pressed. Note that the present operation example corresponds to the processing of step S50 of FIG. 4.

Since the setting history information display screen W20 displays the setting history information in a state where no user authentication is performed, pieces of the setting history information related to all users can be viewed.

The setting history information display screen W20 includes a setting history information display area R13, and pieces of the setting history information related to the respective jobs are displayed within the setting history information display area R13, FIG. 16 shows an example of displaying pieces of the setting history information related to jobs executed on the basis of four types of job functions, which are Simple Copy by the user with the execution user name: S000123, Simple Copy by the user with the execution user name: S000065, Simple Scan (Scan to Email) by the user with the execution user name: S000123, and Simple Fax by the user with the execution user name: S000222, in chronological order from newest to oldest.

Here, each piece of the setting history information includes a setting value display area R15, a user name display area R17, a job function display area R19, a job execution date and time display area R21, a processing selection button B15, and a start button B17.

The setting value display area R15 is a display area for displaying the setting values included in each piece of the setting history information exemplified in FIG. 3. The setting value items to be displayed in the setting value display area R15 are not particularly limited, and an arbitrary setting value item can be selected and displayed. The figure illustrates an example in which "lateral binding" as the finishing function, "one place", and "manual feed" as the paper tray are displayed, as the setting value items of Simple Copy as the job function.

The user name display area R17 is a display area for displaying the name of the user who has executed the job. The figure illustrates an example in which the user with the user name: S000123 is displayed as the name of the user who has executed the job.

The job function display area R19 is an area for displaying an iconized or thumbnailed image of a screen configuration of the job function and the like input button B11. As the user views the image displayed in the job function display area R19, he/she can ascertain the job function related to the setting history information in question.

The job execution date and time display area R21 is a display area for displaying the date and time when the job was executed.

The processing selection button B15 receives selection of predetermined processing (for example, deletion or pinning) with respect to the setting history information. For example, as the user selects a trash box mark displayed as the processing selection button B15, he/she can delete the relevant setting history information.

Also, as the user selects a pin mark displayed as the processing selection button B15, the relevant setting history information can be displayed preferentially.

The start button B17 receives an input to execute the job based on the setting history information selected by the user. As the user presses the start button B17, he/she can execute the job. Note that the operation of pressing the start button B17 corresponds to the processing of the execution instruction input for a job of step S70 in FIG. 4.

As described above, since the setting history information display screen W20 displays the setting history information in a state where no user authentication is performed, pieces of the setting history information related to all users can be viewed. Therefore, it is difficult to determine whether or not the information is the setting history information related to the job executed by the user himself/herself in the past, and it is highly likely that the user will erroneously select the setting history information. Thus, by setting the confirmation processing which makes the user confirm by himself/herself whether the job based on the selected setting history information can actually be executed or not, it is possible to prevent a job, which is different from the job intended by the user, from being executed.

OPERATION EXAMPLE 1

As the first confirmation processing, a mode of performing, in executing a job based on the selected setting history information, display processing of displaying a message asking whether or not to execute the job will be described as Operation Example 1. Note that the present operation example corresponds to the processing illustrated by the flowchart of FIG. 5.

Figure 17:
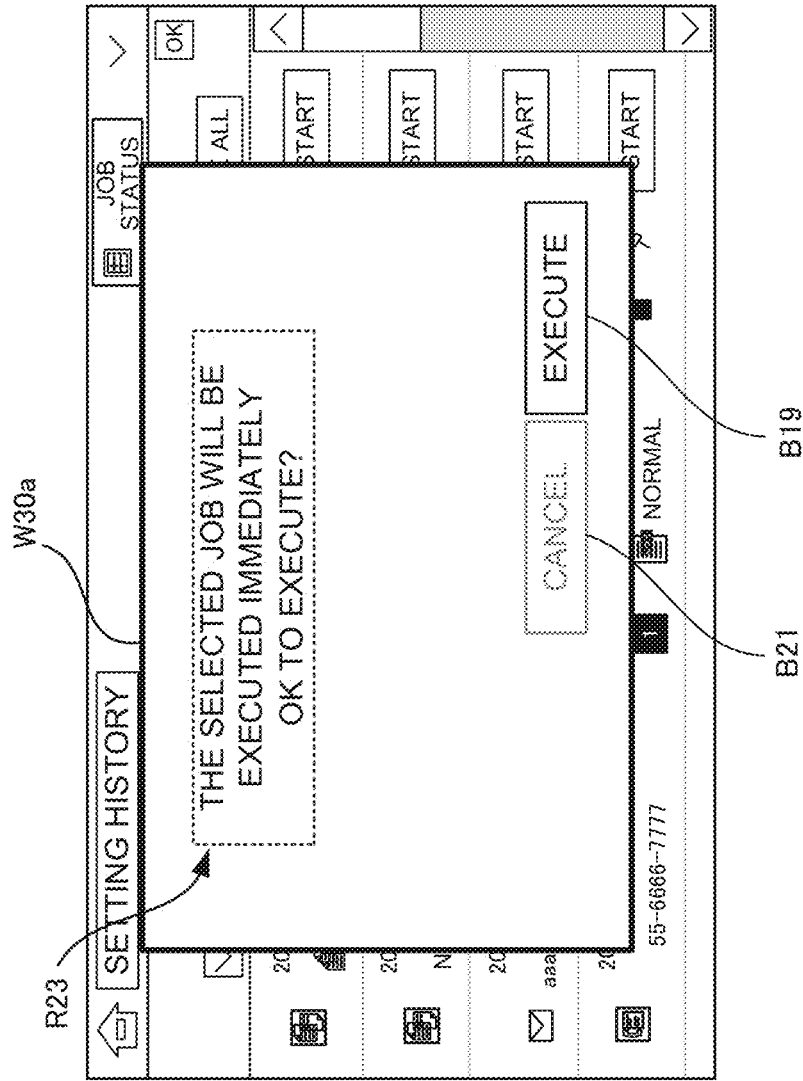
FIG. 17 is a diagram illustrating an operation example of the first embodiment.

FIG. 17 shows a configuration example of a message display screen W30a related to Operation Example 1. The message display screen W30a is a display screen to be displayed, as the controller 11 reads the confirmation processing program 234 and the display processing program 235, in accordance with pressing of the start button B17 of the setting history information display screen W20.

The message display screen W30a includes a message display area R23, an execution button B19, and a cancel button B21.

The message display area R23 is a display area for displaying a message which prompts the user to be attentive. FIG. 17 shows an example in which the words "The selected job will be executed immediately. OK to execute?" are displayed as the message, but the words are not limited to the above. For example, as long as the words can prompt the user to be attentive such as "Are you sure that the selected job is correct? If correct, the job will be executed", the wording is not particularly limited.

The execution button B19 is an input button which receives pressing thereof when the job based on the setting history information selected by the user is to be executed after confirming the message displayed in the message display area R23. Upon receiving pressing of the execution button B19, the controller 11 executes the job by reading the job execution program 231.

The cancel button B21 is an input button which receives pressing thereof when execution of the job based on the setting history information selected by the user is to be cancelled as a result of confirming the message displayed in the message display area R23. Upon receiving pressing of the cancel button B21, the controller 11 cancels the job. Further, although not illustrated in the drawing, apart from the execution button B19 and the cancel button B21, a detail confirmation button for confirming the details of the job may be displayed.

OPERATION EXAMPLE 2

As the first confirmation processing, a mode of performing, in executing a job based on the selected setting history information, display processing of displaying the setting values so that the substance of the aforementioned setting history information can be confirmed will be described as Operation Example 2. Note that the present operation example corresponds to the processing illustrated by the flowchart of FIG. 6.

Figure 18:
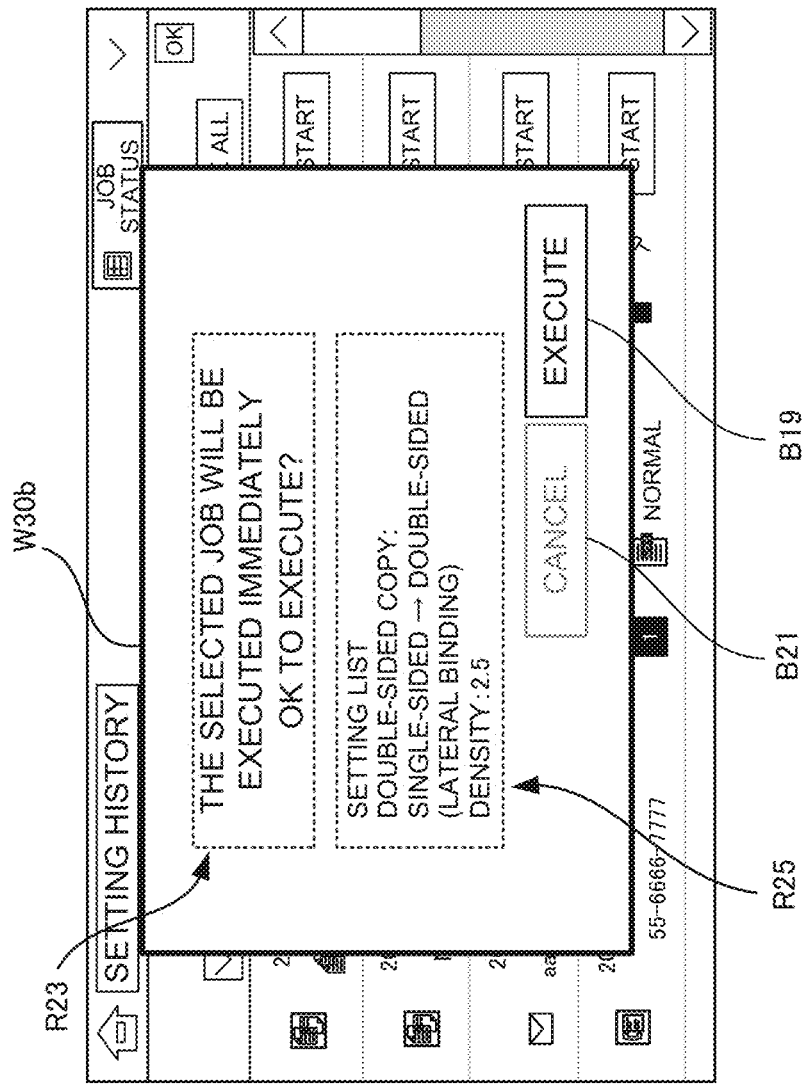
FIG. 18 is a diagram illustrating an operation example of the first embodiment.

The example of FIG. 18 illustrates a setting value display screen W30b including a setting value display area R25 for displaying the setting values, and the message display area R23, the execution button B19, and the cancel button B21 related to Operation Example 1. Since the message display area R23, the execution button B19, and the cancel button B21 have the same configuration as those of Operation Example 1, the same reference numerals are assigned to these constituent elements, and explanation thereof will be omitted.

The setting value display screen W30b is a display screen to be displayed, as the controller 11 reads the confirmation processing program 234 and the display processing program 235, in accordance with pressing of the start button B17 of the setting history information display screen W20.

The setting value display screen W30b includes the setting value display area R25. The setting value display screen W30b may also display the message display area R23, the execution button B19, and the cancel button B21, as exemplified in FIG. 18, or may alternatively be configured from only the setting value display area R25, the execution button B19, and the cancel button B21.

The execution button B19 is an input button which receives pressing thereof when the job based on the setting history information selected by the user is to be executed after confirming the setting values displayed in the setting value display area R25, or the message displayed in the message display area R23. Upon receiving pressing of the execution button B19, the controller 11 executes the job by reading the job execution program 231.

The cancel button B21 is an input button which receives pressing thereof when execution of the job based on the setting history information selected by the user is to be cancelled as a result of confirming the setting values displayed in the setting value display area R25, or the message displayed in the message display area R23. Upon receiving pressing of the cancel button B21, the controller 11 cancels the job.

OPERATION EXAMPLE 3

As the first confirmation processing, a mode of performing, in executing a scan job based on the selected setting history information, preview display processing so that the substance of a read image can be confirmed will be described as Operation Example 3. Note that the present operation example corresponds to the processing illustrated by the flowchart of FIG. 7.

Figure 19:
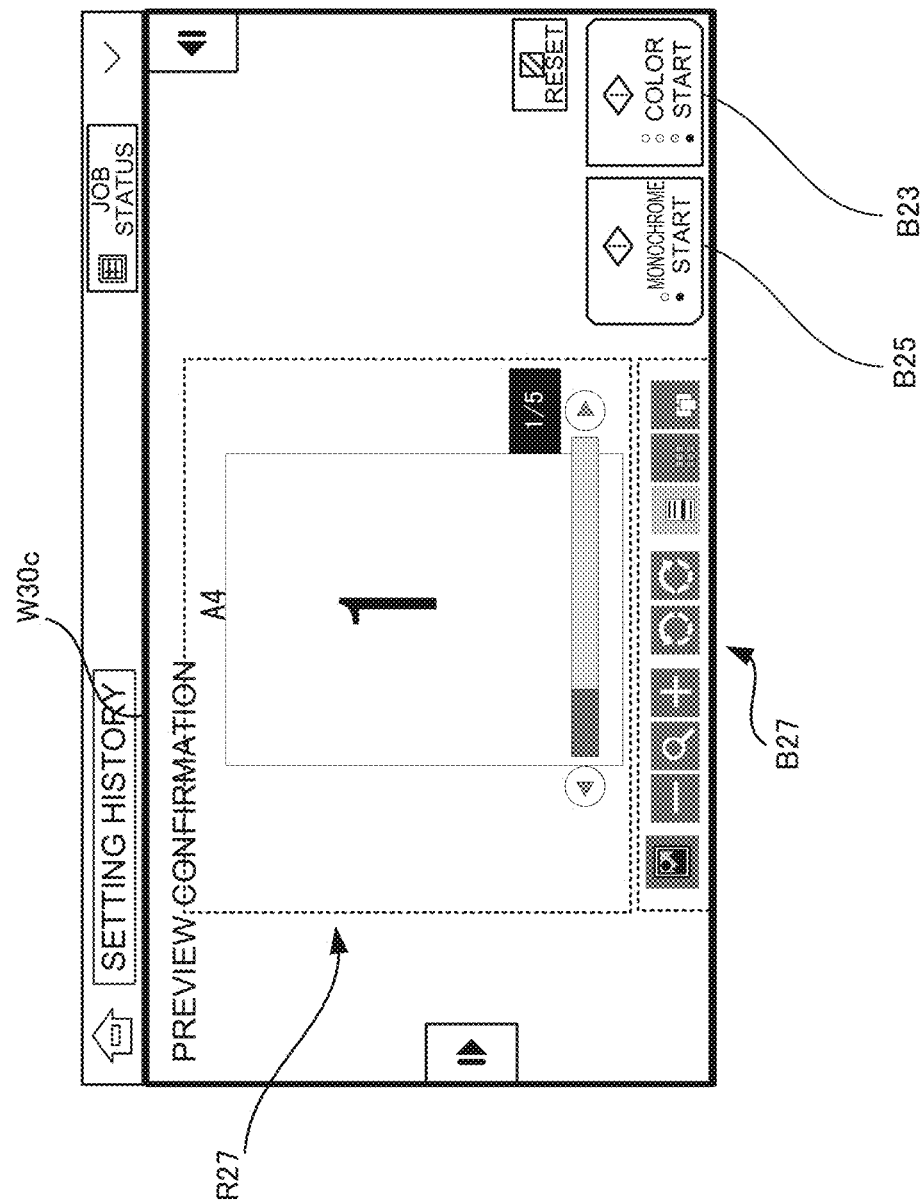
FIG. 19 is a diagram illustrating an operation example of the first embodiment.

A preview display screen W30c illustrated as an example in FIG. 19 is a display screen to be displayed, as the controller 11 reads the confirmation processing program 234 and the display processing program 235, in accordance with pressing of the start button B17 of the setting history information display screen W20.

The preview display screen W30c includes a preview display area R27, a color start button B23, a monochrome start button B25, and a function selection button B27.

The preview display area R27 is a display area for performing preview display of a read image generated by the image reader 21.

The color start button B23 or the monochrome start button B25 is an input button which receives selection from a user who has confirmed a preview display of the read image as to which mode of a color mode or a monochrome mode the job based on the read image (such as copying, temporary storage of data, e-mail transmission as an attached image, etc.) is to be executed.

Upon receiving pressing of either button of the color start button B23 or the monochrome start button B25 by the user, the controller 11 executes the job by reading the job execution program 231. In the present operation example, an example in which two start buttons, i.e., the start buttons B23 and B25, are displayed is indicated. However, the present operation example does not exclude an example which displays a single start button obtained by integrating a monochrome start button and a color start button.

The function selection button B27 is an input button which receives selection of various functions such as enlargement processing, reduction processing, and redo of the operation on a preview screen.

OPERATION EXAMPLE 4

As the first confirmation processing, a mode of performing, in executing a print job based on the selected setting history information, trial print processing will be described as Operation Example 4. Note that the present operation example corresponds to the processing illustrated by the flowchart of FIG. 8.

Figure 20:
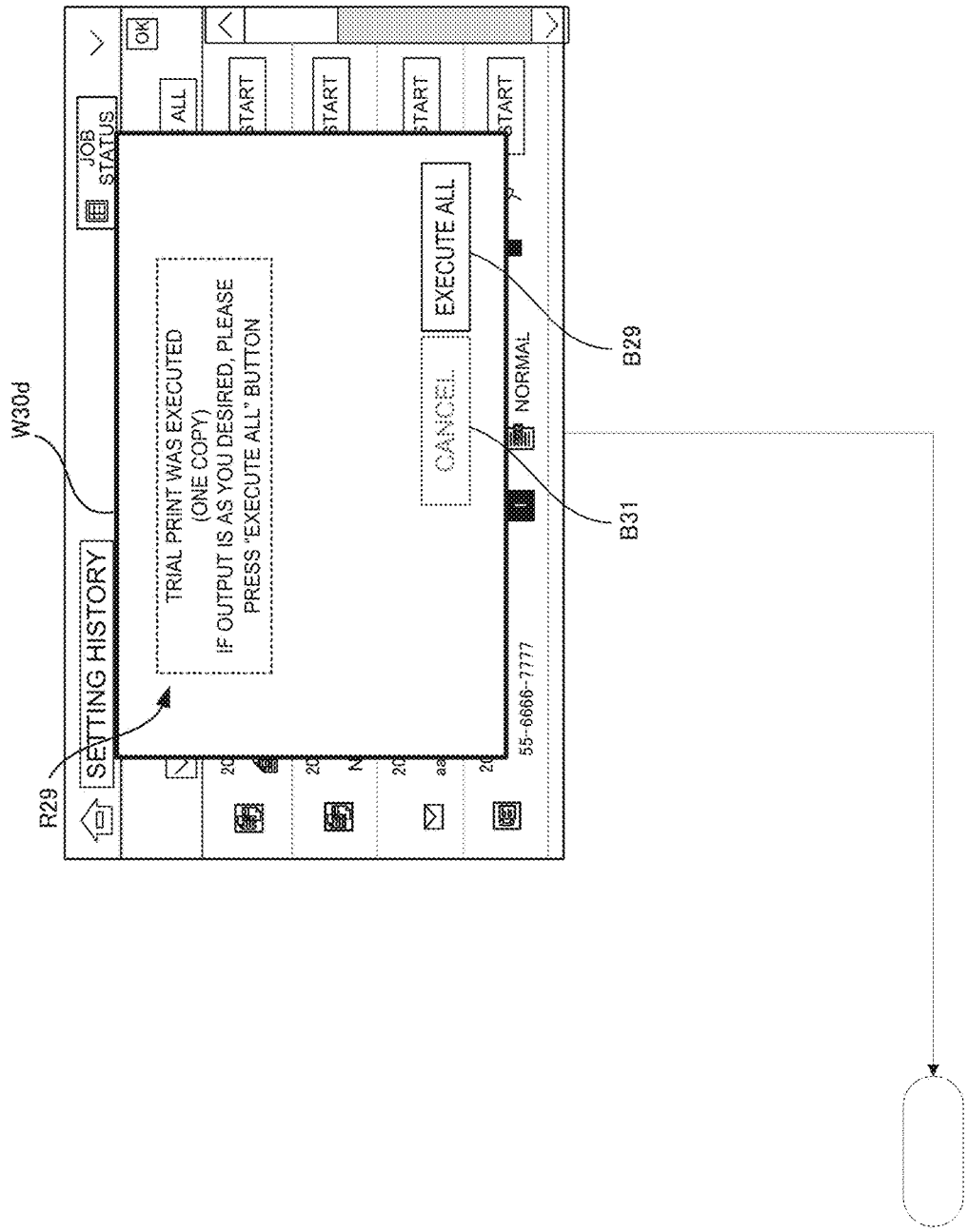
FIG. 20 is a diagram illustrating an operation example of the first embodiment.

A message display screen W30d illustrated as an example in FIG. 20 is a display screen to be displayed, as the controller 11 reads the confirmation processing program 234 and the display processing program 235, in accordance with pressing of the start button B17 of the setting history information display screen W20.

The message display screen W30d includes a message display area R29, an "Execute All" button B29, and a cancel button B31.

The message display area R29 is a display area for displaying a message asking the user whether after printing only one copy as a trial print, the remaining number of copies should be printed or not FIG. 20 shows an example in which the words "Trial print was executed (one copy). If output is as you desired, please press "Execute All" button." are displayed as the message, but the words are not limited to the above. As long as the words can make the user understand the intent of the inquiry, the wording is not particularly limited.

The "Execute All" button B29 is an input button which receives pressing thereof when the user wishes to, after confirming the message displayed in the message display area R29, print the remaining number of copies. Upon receiving pressing of the "Execute All" button B29, the controller 11 executes printing of the remaining number of copies.

The cancel button B31 is an input button which receives pressing thereof when the user wishes to, as a result of confirming the message displayed in the message display area R29, cancel printing of the remaining number of copies. Upon receiving pressing of the cancel button B31, the controller 11 cancels the job.

In the example illustrated in FIG. 20, one copy is printed on a mandatory basis, but it is also possible to adopt a configuration in which a "Trial Print" button is provided on the screen or separately, for example, to allow the user to select whether to print one copy first. Furthermore, although not illustrated in the drawing, apart from the "Execute All" button B29 and the cancel button B31, a setting change button for changing the settings of the job may be displayed.

OPERATION EXAMPLE 5

As the first confirmation processing, a mode of performing, in executing a transmission job based on the selected setting history information, transmission-after-temporary-suspension-processing, which transmits transmission data after temporary suspension, in order to prevent erroneous transmission of the transmission data will be described as Operation Example 5. Note that the present operation example corresponds to the processing illustrated by the flowchart of FIG. 9.

A job status reporting screen W40 illustrated as an example in FIG. 21 can be called at any arbitrary timing. As illustrated in FIG. 21, for example, the job status reporting screen W40 is configured such that the state of progress (status) of a job can lie ascertained for each job function, such as the print job, scan job, fax job, and Internet Fax job.

FIG. 21 indicates the state of progress of the fax job, and the status of a job related to facsimile transmission surrounded by a dotted frame in the figure is "waiting".

In a case where the setting history information relates to a transmission job such as facsimile transmission, as illustrated in FIG. 21, in order to prevent erroneous transmission, even if the start button 1317 on the setting history information display screen W20 is pressed, processing of transmission data suspension is executed.

Further, unless the user orders that the job execution should be stopped, the controller 11 transmits the transmission data after a lapse of a certain period of time. Note that the time to be suspended can be set by the user freely.

OPERATION EXAMPLE 6

As the first confirmation processing, a mode of performing, in executing a transmission job based on the selected setting history information, destination list display processing, which displays a list of destinations so that the details of the sending destination can be confirmed, in order to prevent erroneous transmission of the transmission data will be described as Operation Example 6. Note that the present operation example corresponds to the processing illustrated by the flowchart of FIG. 10.

Figure 22:
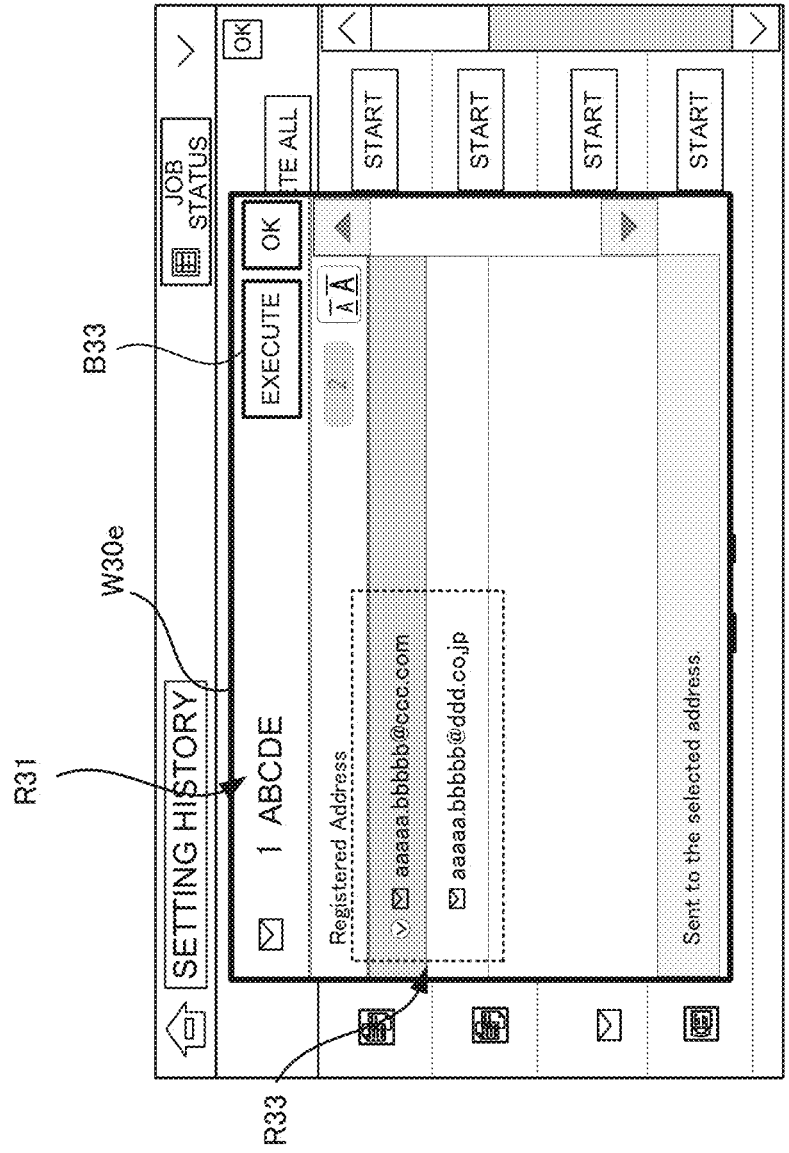
FIG. 22 is a diagram illustrating an operation example of the first embodiment.

A destination list display screen W30e illustrated as an example in FIG. 22 is a display screen to be displayed, as the controller 11 reads the confirmation processing program 234 and the display processing program 235, in accordance with pressing of the start button B17 of the setting history information display screen W20.

The destination list display screen W30e includes a sender display area R31, a destination list display area 1233, and an execution button B33.

The sender display area R31 is a display area for displaying the sender of a transmission job (e-mail transmission in the example illustrated in FIG. 22).

The destination list display area R33 is a display area for displaying pieces of destination information as a list when, in the setting history information in which the sender "ABCDE" is set as the sender of an e-mail, for example, a plurality of persons (locations) are registered as the destination of the e-mail.

The execution button B33 is an input button which receives, after the sender has selected the destination to which the e-mail is to be sent, pressing thereof when the e-mail is to be sent to the selected destination. Upon receiving pressing of the execution button B33, the controller 11 sends the e-mail to the selected destination. Note that an e-mail transmission destination can be selected, for example, by specifying the e-mail address displayed as the destination, as illustrated in FIG. 22. In doing so, the specified e-mail address is marked with a check mark indicating that this e-mail address has been specified. Furthermore, although not illustrated in the drawing, a destination edit button for editing (adding or deleting) the destinations displayed as a list may also be displayed.

OPERATION EXAMPLE 7

As the first confirmation processing, a mode of performing message display processing of asking, in a schedule job which executes a specific job regularly, on the basis of the selected setting history information, whether or not to execute the job at a timing different from that of regular execution, will be described as Operation Example 7. Note that the present operation example corresponds to the processing illustrated by the flowchart of FIG. 11.

Figure 23:
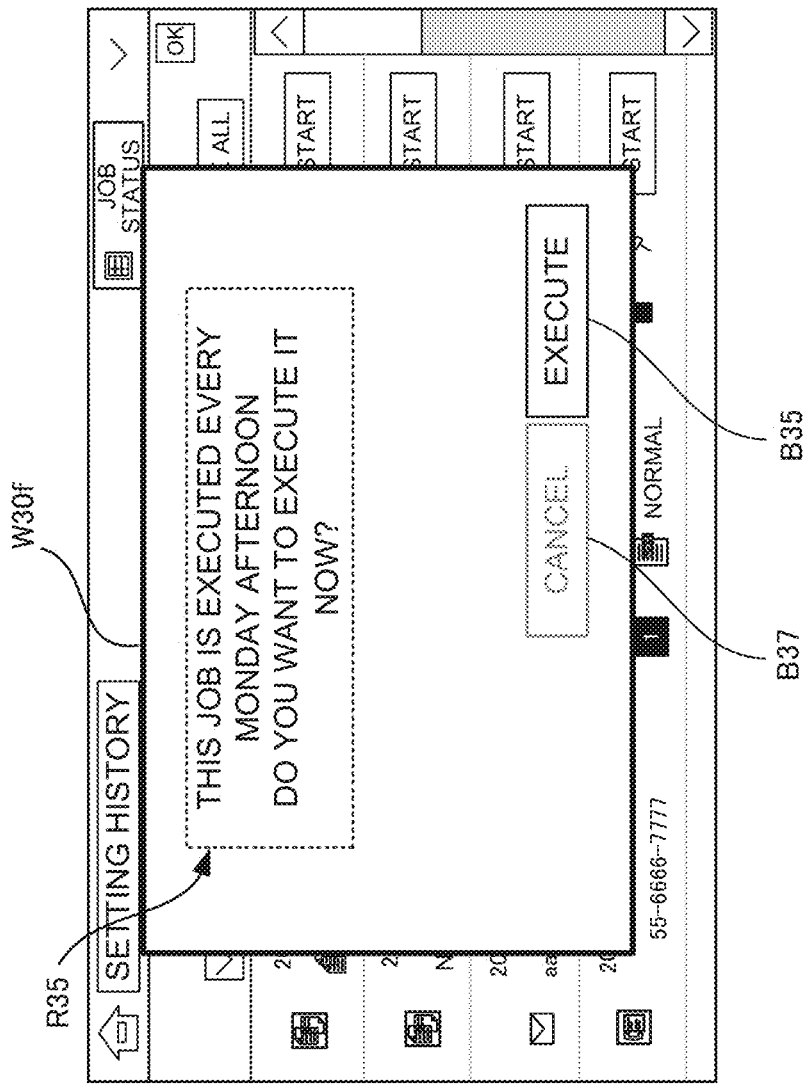
FIG. 23 is a diagram illustrating an operation example of the first embodiment.

A message display screen W30f illustrated as an example in FIG. 23 is a display screen to be displayed, as the controller 11 reads the confirmation processing program 234 and the display processing program 235, in accordance with pressing of the start button B17 of the setting history information display screen W20.

The message display screen W30f includes a message display area R35, an execution button B35, and a cancel button B37.

The message display area R35 is a display area for displaying a message asking whether or not to execute a specific job, when the job is to be executed at a timing different from that of regular execution in a schedule job which executes the specific job regularly. FIG. 23 shows an example in which the words "This job is executed every Monday afternoon. Do you want to execute it now?" are displayed as the message, but the words are not limited to the above. As long as the words can make the user understand the intent of the inquiry, the wording is not particularly limited.

The execution button B35 is an input button which receives pressing thereof when the user wishes to execute the job after confirming the message displayed in the message display area R35. Upon receiving pressing of the execution button B35, the controller 11 executes the job by reading the job execution program 231.

The cancel button B37 is an input button which receives pressing thereof when the user wishes to cancel execution of the job in question as a result of confirming the message displayed in the message display area R35. Upon receiving pressing of the cancel button B37, the controller 11 cancels the job. Further, although not illustrated in the drawing, a schedule change button for changing the schedule for executing the job and making a reservation of the job may be displayed.

OPERATION EXAMPLE 8

As the first confirmation processing, a mode of performing, in executing a job based on the selected setting history information, multiple-display processing of displaying multiple pieces of similar setting history information, when there exist pieces of similar setting history information in a similar time period, will be described as Operation Example 8. Note that the present operation example corresponds to the processing illustrated by the flowchart of FIG. 12.

Figure 24:
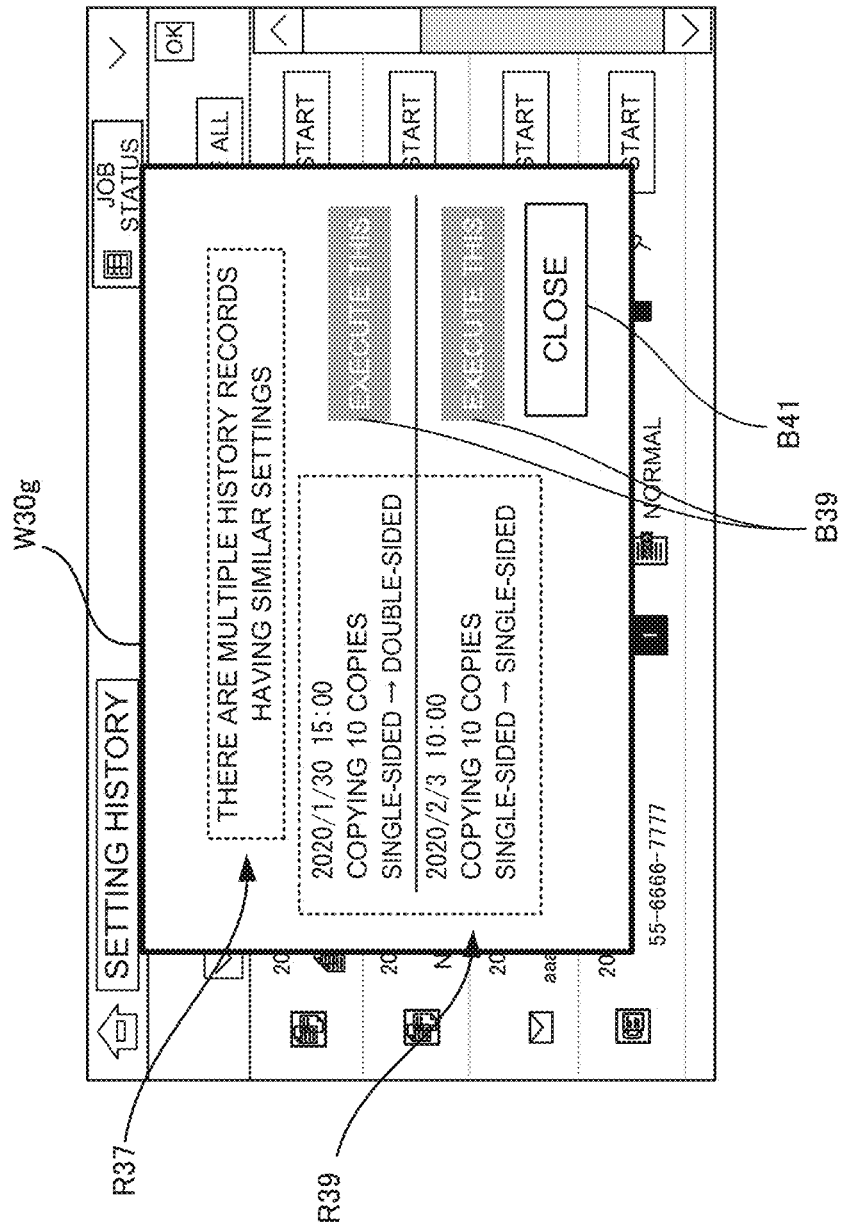
FIG. 24 is a diagram illustrating an operation example of the first embodiment.

A similar setting history information display screen W30g illustrated as an example in FIG. 24 is a display screen to be displayed, as the controller 11 reads the confirmation processing program 234 and the display processing program 235, in accordance with pressing of the start button B17 of the setting history information display screen W20.

The similar setting history information display screen W30g includes a message display area R37, a similar setting history information display area R39, an "Execute This" button B39, and a close button B41.

The message display area R37 is a display area for displaying, in executing a job based on the selected setting history information, a message to the effect that there exists similar setting history information in a similar time period. FIG. 24 shows an example in which the words "There are history records having similar settings" are displayed as the message, but the words are not limited to the above. As long as the words can make the user understand that there exists similar setting history information, the wording is not particularly limited.

The similar setting history information display area R39 is a display area for displaying, in a case where there exists similar setting history information as a result of performing the similarity determination processing of determining similarity between the setting values of the received setting history information and the setting values of the other pieces of the setting history information stored in the setting history information storage area 237, the similar setting history information.

The "Execute This" button B39 is an input button which receives selection of the setting history information corresponding to a job that the user wishes to execute from among pieces of the setting history information displayed in the similar setting history information display area R39. Upon receiving pressing of the "Execute This" button B39, the controller 11 executes the job by reading the job execution program 231.

The close button B41 is an input button which receives pressing thereof when the similar setting history information display screen W30g is to be closed. Upon receiving pressing of the close button B41, the controller 11 closes the similar setting history information display screen W30g. The present operation example indicates an example in which two pieces of similar setting history information are displayed. However, the number of pieces of the similar setting history information is not limited to the above, and one piece of similar setting history information or three or more pieces of similar setting history information may be displayed. Furthermore, a UI component for scroll displaying, for example, pieces of similar setting history information may be displayed.

1.3.2 Confirmation Processing Via Second Common Screen

Next, confirmation processing via the second common screen will be described. Prior to describing the confirmation processing via the second common screen, user authentication will be described. The controller 11 performs user authentication by reading the authentication program 232.

Figure 25:
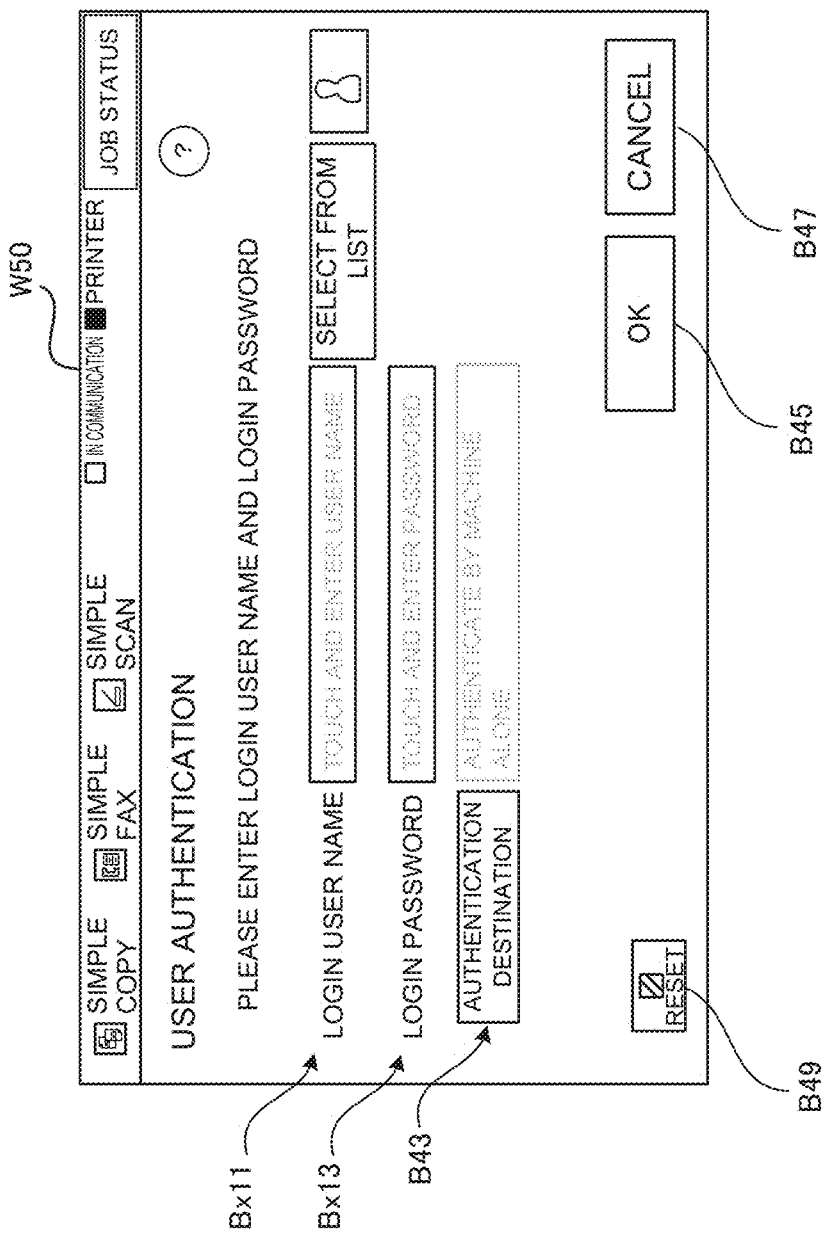
FIG. 25 is a diagram illustrating an operation example of the first embodiment.

FIG. 25 shows a configuration example of a login screen for performing the user authentication. A login screen W50 includes a login user name input box Bx11, a login password input box Bx13, an authentication destination selection button B43, an OK button B45, a cancel button B47, and a reset button B49.

The login user name input box Bx11 is an input box which receives an input of a login user name of a user who attempts to log into the multifunction peripheral 10.

The login password input box Bx13 is an input box which receives an input of a login password associated with the login user name of the user who attempts to log into the multifunction peripheral 10.

The authentication destination selection button B43 is an input button which receives selection of a destination where the user is to be authenticated. The example of FIG. 25 illustrates that a machine (the multifunction peripheral 10) alone is selected as the destination where the user is to be authenticated. When login users are to be managed by another device such as a management server connected via the network (NW), it is possible to select the name of the other device, or positional information (such as an IP address) of the other device on the network.

The OK button B45 is an input button which receives a login authentication operation by the user. The cancel button B47 is an input button which receives cancellation of the login authentication operation by the user.

The reset button B49 is an input button which receives pressing thereof by the user when the input and operation contents are to be restored to a default.

Figure 26:
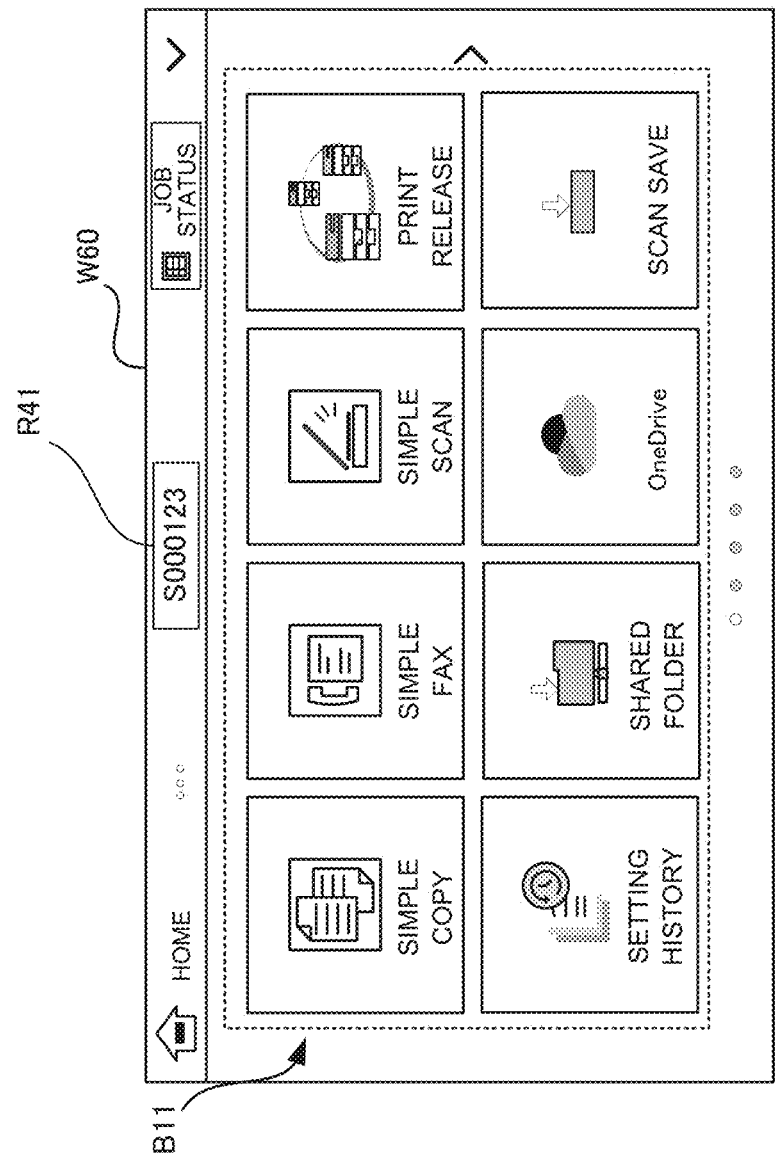
FIG. 26 is a diagram illustrating an operation example of the first embodiment.

FIG. 26 is a diagram illustrating a configuration example of a second common screen W60. The second common screen W60 is a home screen to be displayed when the user authentication via the login screen W50 is successful.

The configuration of the second common screen W60 can be made the same as that of the first common screen W10, but is different in that a login user name display area R41 is included.

The login user name display area R41 is a display area for displaying the user name of a user who has successfully logged into the multifunction peripheral 10 and has been authenticated. FIG. 26 illustrates an example in which the user with the user name: S000123 is displayed as the login user. Note that in the example illustrated in FIG. 26, a display position of the login user name display area R41 is set to the upper part of the second common screen W60. However, as long as the login user name can be recognized by a viewing user, the display position is not limited to the above.

Figure 27:
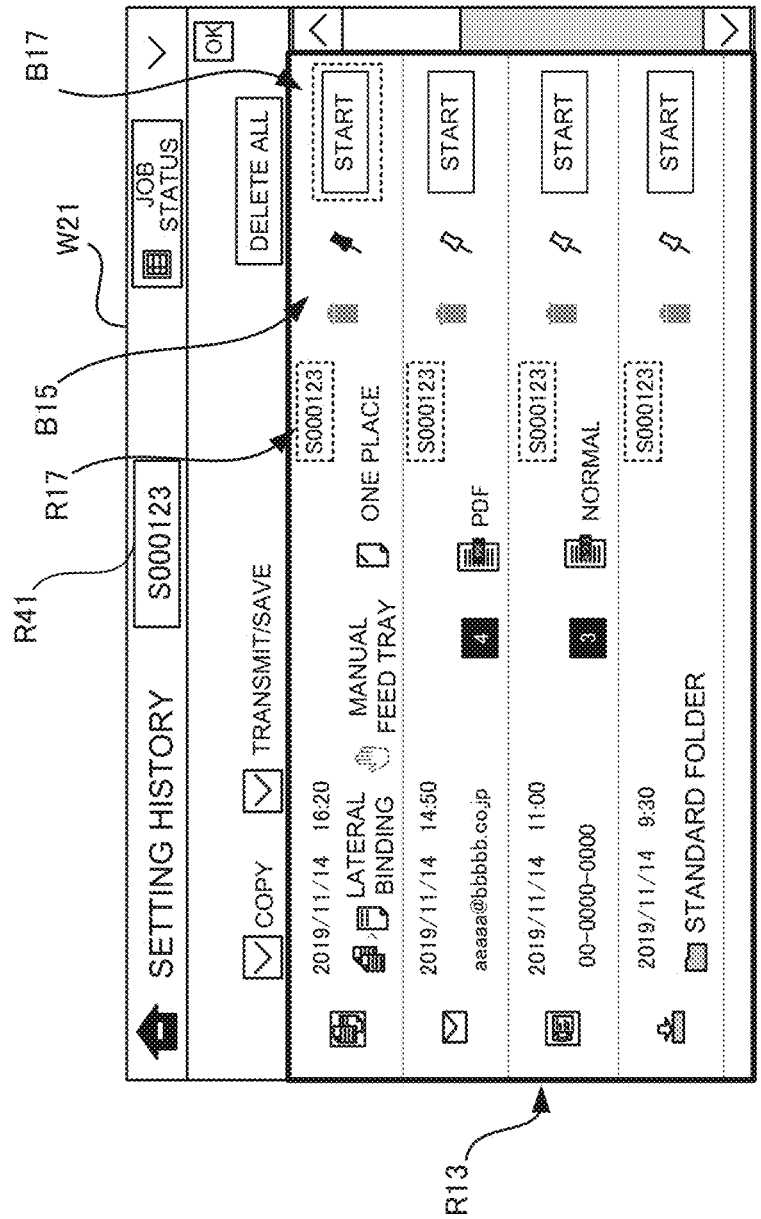
FIG. 27 is a diagram illustrating an operation example of the first embodiment.

FIG. 27 shows a configuration example of a setting history information display screen W21 that the controller 11 displays when the job function and the like input button B11 that is related to instruction to display the setting history information, as shown in FIG. 26, is pressed.

The configuration of the setting history information display screen W21 can be made the same as that of the setting history information display screen W20. Accordingly, the same reference numerals are assigned to the same configuration.

The setting history information display screen W21 includes the setting history information display area 113 as in the setting history information display screen W20. In the setting history information display area R13, pieces of the setting history information related to respective jobs are displayed. Here, as indicated by the user name display area R17, pieces of the setting history information related to jobs executed by the user with the login user name displayed in the login user name display area R41 are displayed.

FIG. 27 shows an example in which pieces of the setting history information related to jobs executed by the login user with the user name: S000123 are collected and displayed. When the user presses the job function and the like input button B11 that is related to instruction to display the setting history information on the second common screen W60 in a state where a login to the multifunction peripheral 10 is completed, the controller 11 collects and displays pieces of the setting history information related to jobs executed by the login user.

Further, the user can execute the job by pressing the start button B17, as in the case of job execution via the first common screen W10. Note that the operation of pressing the start button B17 corresponds to the processing of the execution instruction input for a job of step S70 in FIG. 4.

OPERATION EXAMPLE 9

As the second confirmation processing, a anode of performing, in executing a filing job based on the selected setting history information, display processing of displaying a message asking whether a data save location related to the execution of the job is correct or incorrect will be described as Operation Example 9. Note that the present operation example corresponds to the processing illustrated by the flowchart of FIG. 13.

Figure 28:
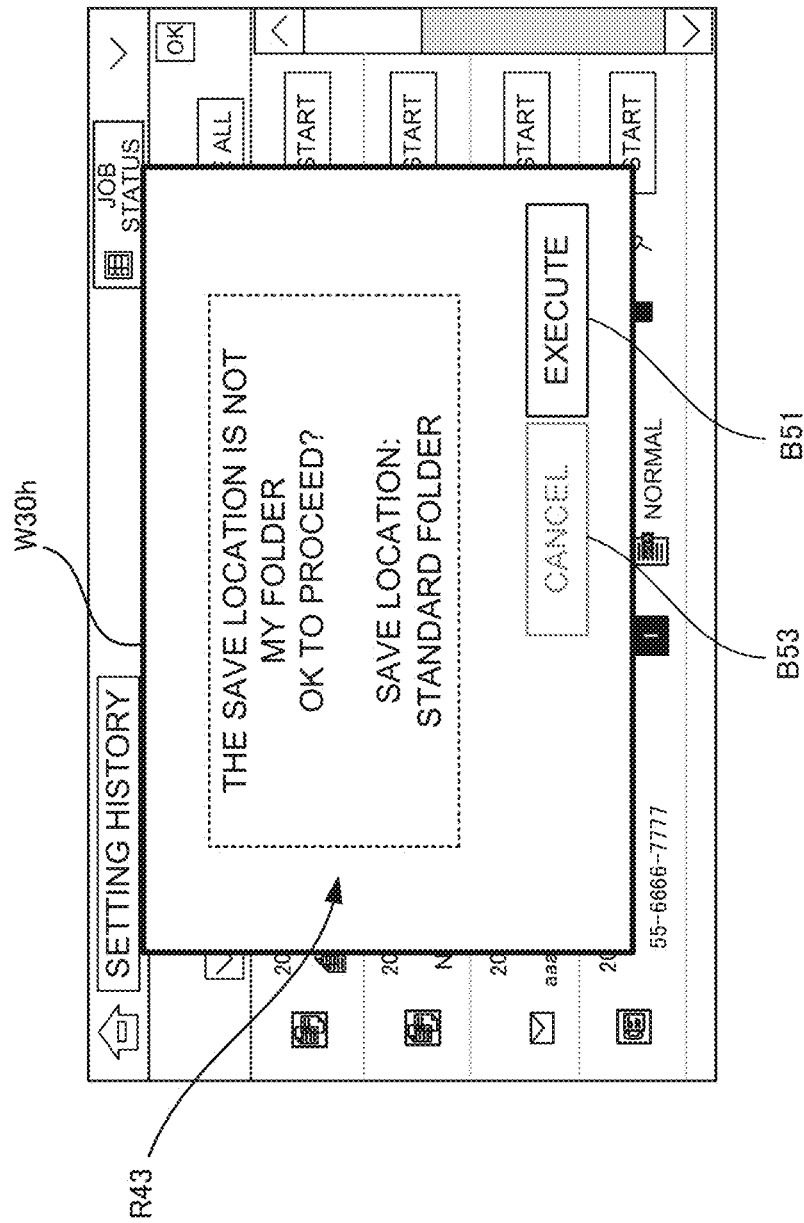
FIG. 28 is a diagram illustrating an operation example of the first embodiment.

A message display screen W30h illustrated as an example in FIG. 28 is a display screen to be displayed, as the controller 11 reads the confirmation processing program 234 and the display processing program 235, in accordance with pressing of the start button B17 of the setting history information display screen W21.

The message display screen W30h includes a message display area R43, an execution button B51, and a cancel button B53.

The message display area R43 is a display area for displaying, in executing a filing job based on the selected setting history information, a message asking whether a data save location related to the execution of the job is correct or incorrect. FIG. 28 shows an example in which the words "The save location is not My Folder. OK to proceed?" are displayed as the message, but the words are not limited to the above. As long as the words can make the user understand the intent of the inquiry, the wording is not particularly limited.

The execution button B51 is an input button which receives pressing thereof when the user wishes to execute the job after confirming the message displayed in the message display area R43. Upon receiving pressing of the execution button B51, the controller 11 executes the job by reading the job execution program 231. In this case, the controller 11 executes the job without changing the data save location.

The cancel button B53 is an input button which receives pressing thereof when the user wishes to cancel execution of the job in question as a result of confirming the message displayed in the message display area R43. Upon receiving pressing of the cancel button B53, the controller 11 cancels the job. Further, although not illustrated in the drawing, a save location change button for changing the data save location related to the job execution to an arbitrary save location may be displayed.

OPERATION EXAMPLE 10

As the second confirmation processing, a mode of performing, in executing the filing job based on the selected setting history information, display processing of displaying a message asking about a change in the data save location, if the data save location related to the execution of the job has been changed, will be described as Operation Example 10. Note that the present operation example corresponds to the processing illustrated by the flowchart of FIG. 14.

Figure 29:
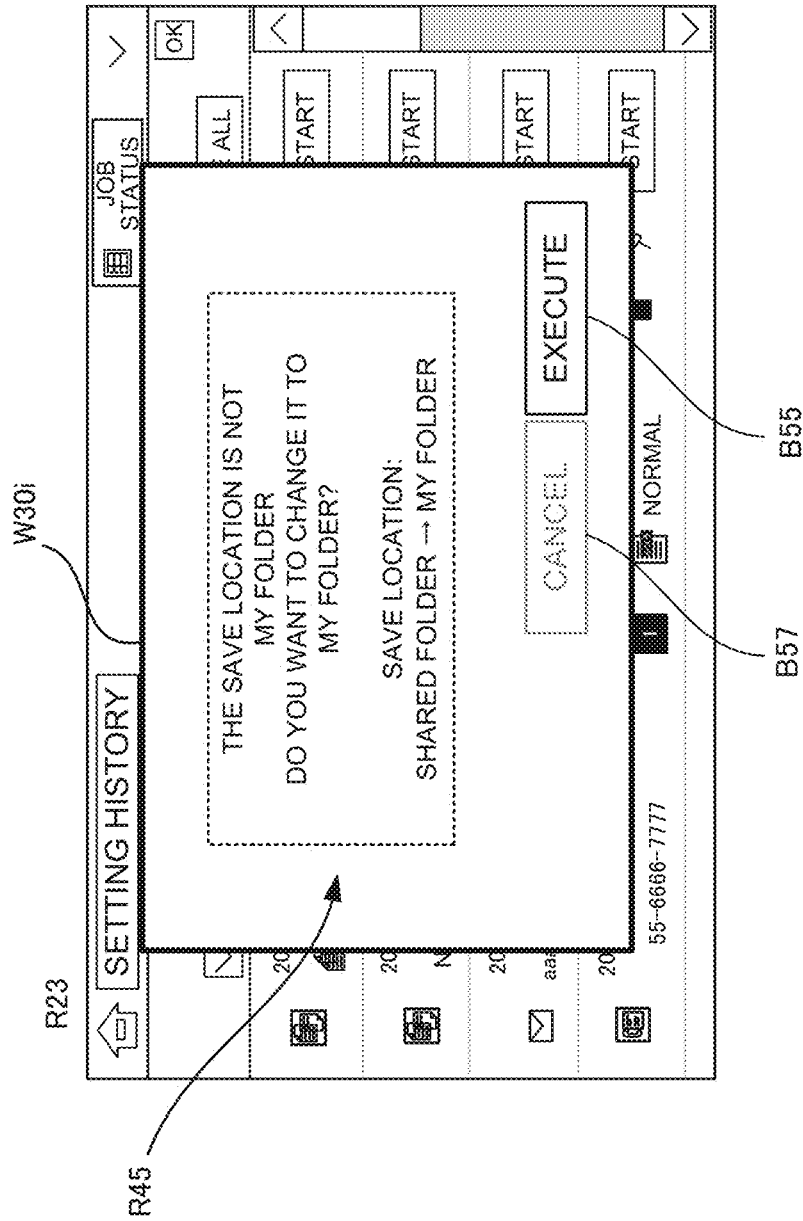
FIG. 29 is a diagram illustrating an operation example of the first embodiment.

A message display screen W30i illustrated as an example in FIG. 29 is a display screen to be displayed, as the controller 11 reads the confirmation processing program 234 and the display processing program 235, in accordance with pressing of the start button B17 of the setting history information display screen W21.

The message display screen W30i includes a message display area R45, an execution button B55, and a cancel button B57.

The message display area R45 is a display area for displaying, in executing a filing job based on the selected setting history information, a message asking about a change in the data save location, if the data save location related to the execution of the job has been changed. FIG. 29 shows an example in which the words "The save location is not My Folder. Do you want to change it to My Folder?" are displayed as the message, but the words are not limited to the above. As long as the words can make the user understand the intent of the inquiry, the wording is not particularly limited.

The execution button B55 is an input button which receives pressing thereof when the user wishes to execute the job after confirming the message displayed in the message display area R45. Upon receiving pressing of the execution button B55, the controller 11 executes the job by reading the job execution program 231. In this case, the controller 11 changes the data save location and executes the job.

The cancel button B57 is an input button which receives pressing thereof when the user wishes to cancel execution of the job in question as a result of confirming the message displayed in the message display area R45. Upon receiving pressing of the cancel button B57, the controller 11 cancels the job. Further, although not illustrated in the drawing, a save location change button for changing the data save location related to the job execution to an arbitrary save location other than My Folder may be displayed.

Incidentally, only pieces of the setting history information related to jobs executed by the login user are displayed within the setting history information display area R13 of the setting history information display screen W21. In this case, there is no possibility that the login user will select the setting history information related to jobs executed by other users. However, since pieces of the setting history information related to a number of jobs that the user himself/herself executed in the past are displayed as a list, there is still a possibility that incorrect setting history information may be selected. For this reason, also in the confirmation processing via the second common screen, the confirmation processing indicated in Operation Examples 1 to 8 may be performed.

As described above, according to the first embodiment, confirmation processing corresponding to the user authentication is executed, upon receiving an execution instruction input for a job (for example, pressing of the execution button), before the job in question is executed. Consequently, as the user refers to a message and information or the like being displayed, the user can confirm whether the setting history information selected by himself/herself is correct or incorrect. By this feature, it is possible to prevent a job not intended by the user from being executed.

2. Second Embodiment

A multifunction peripheral according to a second embodiment is of a form provided with a selection screen to receive execution of the confirmation processing related to the modes of Operation Examples 1 to 10 described in the first embodiment.

The functional configuration, a flow of processing, and operation examples pertaining to Operation Examples 1 to 10 of the multifunction peripheral according to the second embodiment can be made the same as those of the first embodiment. Thus, explanation thereof is omitted.

Figure 30:
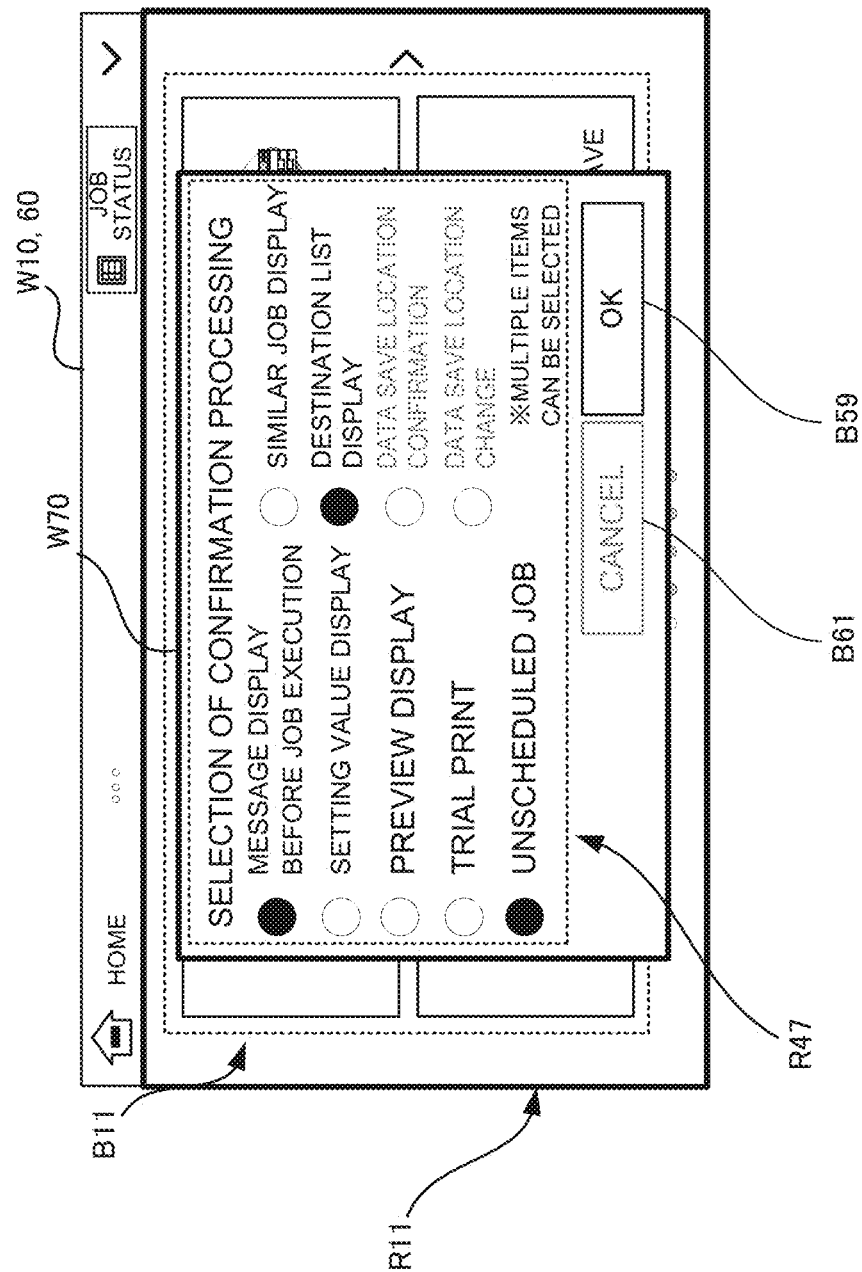
FIG. 30 is a diagram illustrating an operation example of a second embodiment.

FIG. 30 shows a configuration example of a confirmation processing selection screen W70. The confirmation processing selection screen W70 can be presented by using, for example, the job function and the like input button B11 provided in the job function and the like display area R11 of the first common screen W10 or the second common screen W60, as an activation input button.

The confirmation processing selection screen W70 includes a confirmation processing display area R47, an OK button B59, and a cancel button B61.

The confirmation processing display area R47 displays items of confirmation processing executable by the multifunction peripheral, and also receives selection of the confirmation processing desired by the user. The confirmation processing can be selected independently, or multiple items of the confirmation processing can be selected simultaneously, as illustrated in FIG. 30.

The OK button B59 is an input button which receives a confirmation input for the confirmation processing selection by the user, Upon receiving pressing of the OK button B59, the controller 11 determines the confirmation processing to be executed.

The cancel button B61 is an input button which receives cancellation of the operation of the confirmation processing selection by the user. Upon receiving pressing of the cancel button B61, the controller 11 cancels the above operation.

FIG. 30 represents an example of the confirmation processing selection screen W70 activated via the first common screen W10. The present figure shows an example in which the confirmation processing selection screen W70 is configured such that the confirmation processing pertaining to Operation Examples 1 to 8 can be selected to correspond to the operation examples of the first embodiment. However, the configuration of the selectable confirmation processing is not limited to the above.

The user may adopt a configuration in which desired confirmation processing (including, for example, confirmation processing via the second common screen such as confirmation of a data save location or change of the data save location) can be selected.

The user can select the desired confirmation processing via the first common screen or the second common screen regardless of the state of user authentication. Therefore, according to the second embodiment, in addition to the advantages of the first embodiment, a more friendly user interface can be provided.

The present invention is not limited to the embodiments described above, and various modifications can be made. That is, embodiments obtained by combining technical means modified as appropriate without departing from the spirit of the present invention are also included in the technical scope of the present invention.

Further, although there are some parts in the above embodiments that are described separately for convenience of explanation, it is needless to say that the embodiments may be combined within the technically possible range and implemented.

In addition, the programs that operate in each apparatus in the embodiment are programs that control a CPU or the like which is mounted in a desktop PC (Personal Computer), a notebook PC, a tablet, a smartphone, or other information terminal devices (i.e., programs that cause a computer to function) so as to implement the functions of the above-described embodiments. Moreover, the information handled by these apparatuses is temporarily stored in a temporary storage device (for example, a RAM) when being processed, and then stored in various storage devices such as a ROM and an HDD, where the information is read, corrected, and written by the CPU as needed.

Here, as the recording medium for storing the program, a semiconductor medium (for example, a ROM, a non-volatile memory card, etc.), an optical recording medium/magneto-optical recording medium (for example, a DVD (Digital Versatile Disc), an MO (Magneto Optical Disc), an MD (Mini Disc), a CD (Compact Disc), a BD (Blu-ray Disk [registered trademark], etc.), a magnetic recording medium (for example, a magnetic tape, a flexible disk, etc.) or the like may be used. Further, not only are the functions of the above-described embodiments implemented by executing the loaded program, but the functions of the present invention may also be implemented by processing performed in cooperation with an operating system or other application programs, etc., on the basis of the instructions of the program.

Furthermore, if the program is to be distributed to the market, the program may be stored in a portable recording medium for distribution, or transferred to a server computer connected via a network such as the Internet. In this case, a storage device of the server computer is also included in the present invention as a matter of course.

What is claimed is:

1. An image processing apparatus comprising:
a display;
a storage; and
a controller which executes a job of image processing based on a setting value, wherein the controller:
stores, as setting history information, the setting value of the executed job in the storage;
displays, on the display, a selection screen to select the setting history information stored in the storage;
accepts an execution instruction input for the job based on the setting history information received via the selection screen; and
executes confirmation processing according to a state of user authentication before the job execution.

2. The image processing apparatus according to claim 1, wherein, when executing the confirmation processing, the controller executes first confirmation processing when the user authentication is absent, and executes second confirmation processing which is different from the first confirmation processing when the user authentication is in action.

3. The image processing apparatus according to claim 2, wherein the controller performs, as the first confirmation processing, display processing of displaying a message of inquiry about whether or not to execute the job.

4. The image processing apparatus according to claim 2, wherein the controller performs, as the first confirmation processing, display processing of displaying the setting value included in the setting history information.

5. The image processing apparatus according to claim 2, wherein the controller performs, as the first confirmation processing, preview display processing for a read image in a scan job.

6. The image processing apparatus according to claim 2, wherein the controller performs, as the first confirmation processing, trial print processing in a print job.

7. The image processing apparatus according to claim 2, wherein the controller performs, as the first confirmation processing, one of transmission-after-temporary-suspension-processing and destination list display processing in a transmission job.

8. The image processing apparatus according to claim 2, wherein the controller performs, as the first confirmation processing, display processing of displaying, in a schedule job which executes a specific job regularly, a message of inquiry about whether or not to execute the job at a timing different from a timing of regular execution.

9. The image processing apparatus according to claim 2, wherein the controller displays, as the first confirmation processing, the setting history information similar to the received setting history information, and executes the job based on the selected setting history information.

10. The image processing apparatus according to claim 2, wherein the controller performs, as the second confirmation processing, processing of displaying, in a filing job which saves data, a message of inquiry about whether a data save location is correct or incorrect, or a suggestion for a change of the data save location to have a save location of the data specified, and saving the data in the specified save location.

11. A control method of controlling an image processing apparatus comprising a display, a storage, and a controller which executes a job of image processing based on a setting value, the control method comprising:
storing, as setting history information by the controller, the setting value of the executed job in the storage;
displaying, on the display by the controller, a selection screen to select the setting history information stored in the storage;
accepting, by the controller, an execution instruction input for the job based on the setting history information received via the selection screen; and
executing, by the controller, confirmation processing according to a state of user authentication before the job execution.

12. The image processing apparatus according to claim 2, wherein the controller performs, as the confirmation processing, processing of displaying information which includes decision-making material for confirming whether or not the setting history information selected by a user is related to the job desired by the user, or a message which prompts attention to be called.

* * * * *